US009128237B2

(12) United States Patent
Mukasa

(10) Patent No.: US 9,128,237 B2
(45) Date of Patent: Sep. 8, 2015

(54) OPTICAL FIBER AND OPTICAL TRANSMISSION SYSTEM

(71) Applicant: Furukawa Electric Co., Ltd., Tokyo (JP)

(72) Inventor: Kazunori Mukasa, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 89 days.

(21) Appl. No.: 13/962,642

(22) Filed: Aug. 8, 2013

(65) Prior Publication Data

US 2014/0029906 A1  Jan. 30, 2014

Related U.S. Application Data

(63) Continuation of application No. PCT/JP2012/052865, filed on Feb. 8, 2012.

(30) Foreign Application Priority Data

Feb. 9, 2011  (JP) ................................. 2011-026176
Sep. 29, 2011  (JP) ................................. 2011-215488

(51) Int. Cl.
*G02B 6/02*  (2006.01)
*G02B 6/036*  (2006.01)

(52) U.S. Cl.
CPC .............. *G02B 6/03627* (2013.01); *G02B 6/02* (2013.01); *G02B 6/02019* (2013.01); *G02B 6/02042* (2013.01); *G02B 6/0365* (2013.01)

(58) Field of Classification Search
CPC ............. G02B 6/03627; G02B 6/0365; G02B 6/02019
See application file for complete search history.

(56) References Cited

U.S. PATENT DOCUMENTS

| 4,877,304 A | 10/1989 | Bhagavatula |
| 4,889,404 A | 12/1989 | Bhagavatula et al. |
| 7,440,662 B2 | 10/2008 | Antona et al. |
| 8,041,172 B2 | 10/2011 | Sillard et al. |
| 2013/0084077 A1 | 4/2013 | Mukasa |
| 2013/0251323 A1 | 9/2013 | Mukasa |

FOREIGN PATENT DOCUMENTS

| JP | 01-163707 A | 6/1989 |
| JP | 2007-86776 A | 4/2007 |
| JP | 2008-257250 A | 10/2008 |

OTHER PUBLICATIONS

U.S. Appl. No. 14/157,612, filed Jan. 17, 2014, Mukasa.

(Continued)

*Primary Examiner* — Jerry Rahll
(74) *Attorney, Agent, or Firm* — Oblon, McClelland, Maier & Neustadt, L.L.P.

(57) ABSTRACT

An optical fiber includes a core portion and a cladding portion that is formed on an outer periphery of the core portion and has a refractive index lower than a maximum refractive index of the core portion. Characteristics at a wavelength of 1550 nm are an effective core area of a fundamental propagation mode of equal to or larger than 120 µm$^2$, an effective core area of a first higher-order propagation mode of equal to or larger than 170 µm$^2$, and an effective refractive index of the first higher-order propagation mode of larger than the refractive index of the cladding portion by equal to or larger than 0.0005.

15 Claims, 23 Drawing Sheets

(56) References Cited

OTHER PUBLICATIONS

International Search Report mailed May 1, 2012 for PCT/JP2012/052865 filed on Feb. 8, 2012 with English Translation.

International Written Opinion mailed May 1, 2012 for PCT/JP2012/052865 filed on Feb. 8, 2012.

Cvijetic, M.M et al., Design Considerations of Dispersion-Free Dual-Mode Optical Fibers: 1.55μm Wavelength Operation, IEEE Journal of Quantum Electronics, May 1987, vol. QE-23, No. 5, pp. 469-472.

Yasuyuki Kato et al., "2 Mode Hikari Fiber no Denso Tokusei", Electrical Communication Laboratories Technical Journal, Nov. 22, 1980, vol. 29, No. 11, pp. 1869-1880 (without translation).

Kitayama, K. et al., Transmission Characteristic Measurement of Two-Mode Optical Fiber with a Nearly Optimum Index-Profile, IEEE Transactions on Microwave Theory and Techniques, Jun. 1980, vol. MTT-28, No. 6, pp. 604-608.

Kato, Y. et al., Design Considerations of Broadband W-Type Two-Mode Optical Fibers, IEEE Transactions on Microwave Theory and Techniques, Jan. 1982, vol. MTT-30, No. 1, pp. 1-5.

Sakai, J. et al., Design Considerations of Broadband Dual-Mode Optical Fibers, IEEE Transactions on Microwave Theory and Techniques, Sep. 1978, vol. MTT-26, No. 9, pp. 658-665.

Tsukitani, M. et al., Ultra Low Nonlinearity Pure-Silica-Core Fiber with an Effective Area of 211μm$^2$ and Transmission Loss of 0.159dB/km, 28th European Conference on Optical Communication, 2002, ECOC 2002, vol. 2, Sep. 12, 2002.

C. Koebele, M.Salsi, G.Charlet, S.Bigo, "Nonlinear Effects in Long-Haul Transmission over Bimodal Optical Fibre", ECOC 2010, Sep. 19-23, 2010, Torino—Italy.

Bernd Franz, Detlef Suikat, Roman Dischler, Fred Buchali, Henning Buelow, "High Speed OFDM Data Transmission Over 5 Km GI-Multimode Fiber Using Spatial Multiplexing with 2×4 MIMO Processing", ECOC 2010, Sep. 19-23, 2010, Torino—Italy.

Marianne Bigot-Astruc, Frans Gooijer, Nelly Montaigne, Pierre Sillard, "Trench-Assisted Profiles for Large-Effective-Area Single-Mode Fibers", ECOC 2008, Sep. 21-25, 2008, Brussels—Belgium.

Yoshinori Yamamoto, Masaaki Hirano, Kazuya Kuwahara, Takashi Sasaki, "OSNR-Enhancing Pure-Silica-Core Fiber with Large Effective Area and Low Attenuation", OSA/OFC/NFOEC 2010.

Marianne Bigot-Astruc, et al., "125 μm glass diameter single-mode fiber with $A_{eff}$ of 155 μm$^2$ ", OSA/OFC/NFOEC 2011.

Katsunari Okamoto, "Theory of Optical Waveguides", Corona Publishing Co., Ltd., Oct. 20, 1992 (with partial English translation).

FIG.5

| 130 | | | | | | FUNDAMENTAL (LP01 MODE) | | | | | HIGHER-ORDER (LP11 MODE) | | | | | | HIGHER-ORDER (LP21 MODE) | |
|---|---|---|---|---|---|---|---|---|---|---|---|---|---|---|---|---|---|---|
| No. | Ra2 | Δ1 | Δ2 | 2a | 2b | DISPERSION | SLOPE | MFD | Aeff | BENDING LOSS | DISPERSION | SLOPE | MFD | neff | Δn | Aeff | BENDING LOSS | neff | LEAKAGE LOSS |
| | | % | % | μm | μm | ps/nm/km | ps/nm²/km | μm | μm² | dB/m | ps/nm/km | ps/nm²/km | μm | | | μm² | dB/m | | dB/m |
| 1 | 2.0 | 0.29 | -0.10 | 14.40 | 28.80 | 21.3 | 0.063 | 12.5 | 134.0 | 4.2E-03 | 17.5 | 0.037 | 10.7 | 1.44507 | 0.00068 | 215.0 | 3.7E+02 | | |
| 2 | 2.0 | 0.34 | -0.10 | 14.40 | 28.80 | 21.4 | 0.064 | 12.2 | 129.3 | 1.5E-05 | 19.7 | 0.049 | 10.2 | 1.44567 | 0.00128 | 199.5 | 6.6E+01 | | |
| 3 | 2.0 | 0.38 | -0.10 | 14.70 | 29.40 | 21.4 | 0.064 | 12.2 | 130.2 | 4.0E-08 | 21.1 | 0.054 | 10.0 | 1.44627 | 0.00188 | 195.3 | 2.6E+00 | | |
| 4 | 2.0 | 0.42 | -0.10 | 14.90 | 29.80 | 21.4 | 0.064 | 12.1 | 130.2 | 8.7E-10 | 22.0 | 0.056 | 9.9 | 1.44684 | 0.00245 | 191.9 | 5.4E-03 | | |
| 5 | 2.0 | 0.46 | -0.10 | 15.00 | 30.00 | 21.4 | 0.065 | 12.1 | 130.3 | 1.6E-10 | 22.6 | 0.058 | 9.7 | 1.44740 | 0.00301 | 188.3 | 6.5E-05 | 1.44472 | 4.9E-06 |
| 6 | 2.0 | 0.50 | -0.10 | 15.20 | 30.40 | 21.3 | 0.065 | 12.0 | 131.0 | 3.0E-11 | 23.1 | 0.059 | 9.6 | 1.44799 | 0.00360 | 187.3 | 3.7E-07 | 1.44530 | 1.2E-09 |
| 7 | 3.0 | 0.30 | -0.10 | 14.30 | 42.90 | 21.4 | 0.063 | 12.3 | 131.6 | 3.3E-04 | 18.8 | 0.049 | 10.5 | 1.44515 | 0.00076 | 207.9 | 6.0E+00 | | |
| 8 | 3.0 | 0.33 | -0.10 | 14.90 | 44.70 | 21.4 | 0.064 | 12.5 | 136.7 | 6.9E-06 | 20.5 | 0.054 | 10.4 | 1.44572 | 0.00133 | 208.0 | 5.4E-01 | | |
| 9 | 3.0 | 0.37 | -0.10 | 15.20 | 45.60 | 21.5 | 0.064 | 12.5 | 137.6 | 2.2E-08 | 21.6 | 0.056 | 10.2 | 1.44632 | 0.00193 | 204.5 | 2.5E-02 | | |
| 10 | 3.0 | 0.43 | -0.10 | 15.10 | 45.30 | 21.4 | 0.064 | 12.2 | 132.3 | 1.3E-10 | 22.3 | 0.058 | 9.9 | 1.44705 | 0.00266 | 193.6 | 2.3E-04 | 1.44444 | 9.2E-05 |
| 11 | 3.0 | 0.47 | -0.10 | 15.20 | 45.60 | 21.4 | 0.065 | 12.1 | 130.9 | 2.2E-14 | 22.8 | 0.059 | 9.8 | 1.44760 | 0.00321 | 190.4 | 2.7E-06 | 1.44495 | 1.6E-08 |
| 12 | 3.0 | 0.50 | -0.10 | 15.30 | 45.90 | 21.3 | 0.065 | 12.0 | 130.7 | 2.2E-12 | 23.1 | 0.060 | 9.7 | 1.44803 | 0.00364 | 188.9 | 6.5E-08 | 1.44536 | 1.0E-10 |
| 13 | 4.0 | 0.30 | -0.10 | 14.10 | 56.40 | 21.3 | 0.063 | 12.3 | 129.1 | 7.5E-05 | 18.8 | 0.050 | 10.6 | 1.44508 | 0.00069 | 205.4 | 8.0E-01 | | |
| 14 | 4.0 | 0.34 | -0.10 | 14.50 | 58.00 | 21.4 | 0.064 | 12.3 | 130.6 | 7.7E-07 | 20.5 | 0.053 | 10.3 | 1.44570 | 0.00131 | 199.9 | 4.5E-02 | 1.44321 | 3.7E+01 |
| 15 | 4.0 | 0.38 | -0.10 | 14.80 | 59.20 | 21.4 | 0.064 | 12.3 | 131.5 | 2.5E-09 | 21.5 | 0.056 | 10.2 | 1.44630 | 0.00191 | 196.5 | 2.4E-03 | 1.44374 | 2.4E+00 |
| 16 | 4.0 | 0.42 | -0.10 | 15.10 | 60.40 | 21.4 | 0.064 | 12.3 | 132.9 | 2.6E-09 | 22.3 | 0.058 | 10.1 | 1.44692 | 0.00253 | 195.0 | 6.4E-05 | 1.44433 | 3.3E-02 |
| 17 | 4.0 | 0.46 | -0.10 | 15.00 | 60.00 | 21.4 | 0.065 | 12.1 | 131.2 | 1.7E-11 | 22.7 | 0.059 | 9.8 | 1.44739 | 0.00300 | 188.2 | 2.3E-06 | 1.44472 | 4.1E-08 |
| 18 | 4.0 | 0.50 | -0.10 | 15.10 | 60.40 | 21.3 | 0.065 | 12.0 | 130.6 | 2.2E-10 | 23.1 | 0.060 | 9.7 | 1.44795 | 0.00356 | 185.6 | 2.7E-08 | 1.44524 | 4.9E-11 |

FIG.6

| 150 | | | | | | FUNDAMENTAL (LP01 MODE) | | | | | | HIGHER-ORDER (LP11 MODE) | | | | | | | HIGHER-ORDER (LP21 MODE) | |
|---|---|---|---|---|---|---|---|---|---|---|---|---|---|---|---|---|---|---|---|---|
| No. | Ra2 | Δ1 | Δ2 | 2a | 2b | DISPERSION | SLOPE | MFD | neff | Aeff | BENDING LOSS | DISPERSION | SLOPE | MFD | neff | Δn | Aeff | BENDING LOSS | neff | LEAKAGE LOSS |
| | | % | % | μm | μm | ps/nm/km | ps/nm²/km | μm | | μm² | dB/m | ps/nm/km | ps/nm²/km | μm | | | μm² | dB/m | | dB/m |
| 1 | 2.0 | 0.22 | -0.10 | 15.10 | 30.20 | 21.3 | 0.063 | 13.4 | 1.44628 | 152.3 | 1.6E-00 | 8.5 | -0.190 | 11.9 | 1.44449 | 0.00010 | 267.8 | 4.8E+02 | | |
| 2 | 2.0 | 0.26 | -0.10 | 15.30 | 30.60 | 21.4 | 0.063 | 13.2 | 1.44684 | 149.5 | 3.9E-02 | 18.4 | 0.041 | 11.2 | 1.44500 | 0.00061 | 236.7 | 1.1E+02 | | |
| 3 | 2.0 | 0.29 | -0.10 | 15.80 | 31.60 | 21.5 | 0.064 | 13.3 | 1.44731 | 153.0 | 9.5E-04 | 20.5 | 0.052 | 11.0 | 1.44550 | 0.00111 | 233.0 | 1.5E+01 | | |
| 4 | 2.0 | 0.33 | -0.10 | 16.00 | 32.00 | 21.5 | 0.064 | 13.1 | 1.44789 | 152.0 | 8.6E-06 | 21.6 | 0.056 | 10.7 | 1.44606 | 0.00167 | 225.6 | 8.2E-01 | 1.44384 | 6.4E+02 |
| 5 | 2.0 | 0.37 | -0.10 | 16.10 | 32.20 | 21.5 | 0.064 | 13.0 | 1.44845 | 150.1 | 3.1E-08 | 22.3 | 0.058 | 10.5 | 1.44660 | 0.00221 | 219.6 | 2.4E-02 | 1.44431 | 3.3E+01 |
| 6 | 2.0 | 0.46 | -0.10 | 16.50 | 33.00 | 21.3 | 0.064 | 12.9 | 1.44977 | 151.3 | 6.8E-13 | 23.3 | 0.061 | 10.3 | 1.44790 | 0.00351 | 214.5 | 6.4E-07 | 1.44555 | 6.6E-11 |
| 7 | 2.0 | 0.50 | -0.10 | 16.60 | 33.20 | 21.2 | 0.065 | 12.8 | 1.45034 | 150.7 | 1.3E-14 | 23.5 | 0.062 | 10.2 | 1.44846 | 0.00407 | 212.2 | 2.4E-09 | 1.44609 | 1.5E-13 |
| 8 | 3.0 | 0.20 | -0.10 | 15.20 | 45.60 | 21.3 | 0.063 | 13.6 | 1.44603 | 156.9 | 5.0E-01 | 15.5 | 0.394 | 12.8 | 1.44428 | -0.00011 | 265.6 | 2.3E+02 | | |
| 9 | 3.0 | 0.22 | -0.10 | 15.30 | 45.90 | 21.4 | 0.063 | 13.4 | 1.44631 | 154.9 | 1.4E-01 | 18.0 | 0.041 | 11.6 | 1.44453 | 0.00014 | 251.8 | 3.0E+01 | | |
| 10 | 3.0 | 0.25 | -0.10 | 15.85 | 47.55 | 21.5 | 0.064 | 13.5 | 1.44677 | 158.4 | 8.7E-03 | 20.0 | 0.053 | 11.4 | 1.44503 | 0.00064 | 245.5 | 4.9E+00 | | |
| 11 | 3.0 | 0.27 | -0.10 | 15.95 | 47.85 | 21.5 | 0.064 | 13.4 | 1.44706 | 157.3 | 1.3E-03 | 20.6 | 0.055 | 11.2 | 1.44530 | 0.00091 | 240.1 | 1.8E+00 | 1.44322 | 1.8E+02 |
| 12 | 3.0 | 0.29 | -0.10 | 16.05 | 48.15 | 21.5 | 0.064 | 13.3 | 1.44734 | 156.5 | 1.3E-04 | 21.1 | 0.056 | 11.0 | 1.44557 | 0.00118 | 235.9 | 6.3E-01 | 1.44345 | 8.1E+01 |
| 13 | 3.0 | 0.32 | -0.10 | 15.85 | 47.55 | 21.5 | 0.064 | 13.1 | 1.44773 | 150.7 | 7.6E-06 | 21.4 | 0.056 | 10.8 | 1.44589 | 0.00150 | 225.1 | 1.8E-01 | 1.44366 | 4.6E+01 |
| 14 | 3.0 | 0.33 | -0.10 | 16.25 | 48.75 | 21.5 | 0.064 | 13.2 | 1.44792 | 155.5 | 1.4E-06 | 21.9 | 0.058 | 10.8 | 1.44613 | 0.00174 | 229.7 | 4.7E-02 | 1.44394 | 1.5E+01 |
| 15 | 3.0 | 0.34 | -0.10 | 16.60 | 49.80 | 21.5 | 0.064 | 13.4 | 1.44809 | 159.8 | 2.4E-07 | 22.2 | 0.059 | 10.9 | 1.44636 | 0.00197 | 233.8 | 1.3E-02 | 1.44420 | 3.5E+00 |
| 16 | 3.0 | 0.43 | -0.10 | 16.50 | 49.50 | 21.4 | 0.065 | 12.9 | 1.44933 | 151.2 | 3.2E-13 | 23.0 | 0.060 | 10.4 | 1.44750 | 0.00311 | 218.0 | 3.9E-06 | 1.44519 | 6.2E-10 |
| 17 | 3.0 | 0.46 | -0.10 | 16.60 | 49.80 | 21.3 | 0.065 | 12.9 | 1.44976 | 150.9 | 1.2E-09 | 23.3 | 0.061 | 10.3 | 1.44793 | 0.00354 | 215.2 | 4.5E-06 | 1.44560 | 6.0E-12 |
| 18 | 3.0 | 0.50 | -0.10 | 16.70 | 50.10 | 21.2 | 0.065 | 12.8 | 1.45034 | 150.3 | 4.2E-08 | 23.5 | 0.062 | 10.2 | 1.44849 | 0.00410 | 214.0 | 1.8E-08 | 1.44614 | 1.5E-14 |
| 19 | 4.0 | 0.20 | -0.10 | 15.00 | 60.00 | 21.3 | 0.063 | 13.6 | 1.44601 | 155.5 | 3.6E-02 | 17.1 | 0.053 | 12.8 | 1.44426 | -0.00013 | 261.4 | 3.2E+01 | | |
| 20 | 4.0 | 0.22 | -0.10 | 15.10 | 60.40 | 21.4 | 0.063 | 13.4 | 1.44628 | 152.2 | 9.8E-03 | 18.2 | 0.049 | 11.7 | 1.44448 | 0.00009 | 249.3 | 7.8E+01 | | |
| 21 | 4.0 | 0.26 | -0.10 | 15.30 | 61.20 | 21.4 | 0.064 | 13.2 | 1.44684 | 149.4 | 5.7E-04 | 19.8 | 0.053 | 11.2 | 1.44500 | 0.00061 | 234.0 | 6.4E-01 | | |
| 22 | 4.0 | 0.27 | -0.10 | 15.75 | 63.00 | 21.5 | 0.064 | 13.4 | 1.44703 | 154.5 | 1.5E-04 | 20.6 | 0.055 | 11.2 | 1.44525 | 0.00086 | 237.0 | 1.7E-01 | | |
| 23 | 4.0 | 0.29 | -0.10 | 15.85 | 63.40 | 21.5 | 0.064 | 13.3 | 1.44732 | 153.7 | 2.1E-05 | 21.1 | 0.056 | 11.1 | 1.44552 | 0.00113 | 232.6 | 4.9E-02 | | |
| 24 | 4.0 | 0.32 | -0.10 | 15.65 | 62.60 | 21.5 | 0.064 | 13.1 | 1.44770 | 147.9 | 1.5E-06 | 21.4 | 0.056 | 10.8 | 1.44583 | 0.00144 | 221.9 | 1.3E-02 | | |
| 25 | 4.0 | 0.33 | -0.10 | 16.05 | 64.20 | 21.5 | 0.064 | 13.2 | 1.44789 | 152.7 | 3.6E-07 | 21.9 | 0.058 | 10.9 | 1.44608 | 0.00169 | 226.2 | 2.3E-02 | 1.44405 | 2.5E-01 |
| 26 | 4.0 | 0.34 | -0.10 | 16.40 | 65.60 | 21.5 | 0.064 | 13.4 | 1.44807 | 156.9 | 2.6E-07 | 22.2 | 0.059 | 10.9 | 1.44630 | 0.00191 | 230.3 | 9.7E-04 | 1.44411 | 1.5E-01 |
| 27 | 4.0 | 0.38 | -0.10 | 16.00 | 64.00 | 21.5 | 0.064 | 13.0 | 1.44858 | 148.0 | 1.1E-09 | 22.4 | 0.059 | 10.6 | 1.44670 | 0.00231 | 216.2 | 1.4E-04 | 1.44437 | 1.4E-03 |
| 28 | 4.0 | 0.46 | -0.10 | 16.40 | 65.60 | 21.3 | 0.065 | 12.9 | 1.44976 | 151.0 | 1.3E-11 | 23.3 | 0.061 | 10.4 | 1.44787 | 0.00348 | 212.7 | 3.0E-08 | 1.44550 | 1.5E-12 |
| 29 | 4.0 | 0.50 | -0.10 | 16.50 | 66.00 | 21.2 | 0.065 | 12.8 | 1.45034 | 150.4 | 2.3E-10 | 23.5 | 0.062 | 10.3 | 1.44843 | 0.00404 | 210.4 | 1.5E-10 | 1.44603 | 2.1E-15 |

FIG.7

| 170 | | | | | | FUNDAMENTAL (LP01 MODE) | | | | | | HIGHER-ORDER (LP11 MODE) | | | | | | | HIGHER-ORDER (LP21 MODE) | |
|---|---|---|---|---|---|---|---|---|---|---|---|---|---|---|---|---|---|---|---|---|
| No. | Ra2 | Δ1 | Δ2 | 2a | 2b | DISPERSION | SLOPE | MFD | neff | Aeff | BENDING LOSS | DISPERSION | SLOPE | MFD | neff | Δn | Aeff | BENDING LOSS | neff | LEAKAGE LOSS |
| | | % | % | μm | μm | ps/nm/km | ps/nm²/km | μm | | μm² | dB/m | ps/nm/km | ps/nm²/km | μm | | | μm² | dB/m | | dB/m |
| 1 | 2.0 | 0.20 | -0.10 | 16.10 | 32.20 | 21.4 | 0.063 | 14.1 | 1.44613 | 169.7 | 3.7E+00 | 13.8 | -0.052 | 12.3 | 1.44451 | 0.00012 | 284.8 | 7.6E+02 | | |
| 2 | 2.0 | 0.23 | -0.10 | 16.50 | 33.00 | 21.5 | 0.064 | 14.1 | 1.44658 | 170.7 | 2.4E-01 | 19.6 | 0.047 | 11.8 | 1.44496 | 0.00057 | 265.4 | 3.4E+02 | | |
| 3 | 2.0 | 0.26 | -0.10 | 16.90 | 33.80 | 21.6 | 0.064 | 14.1 | 1.44703 | 172.6 | 1.4E-02 | 21.1 | 0.055 | 11.6 | 1.44542 | 0.00103 | 259.5 | 2.6E+01 | | |
| 4 | 2.0 | 0.29 | -0.10 | 17.20 | 34.40 | 21.6 | 0.064 | 14.0 | 1.44747 | 173.6 | 3.2E-04 | 21.9 | 0.058 | 11.4 | 1.44587 | 0.00148 | 256.0 | 2.3E+01 | | |
| 5 | 2.0 | 0.33 | -0.10 | 17.20 | 34.40 | 21.5 | 0.064 | 13.8 | 1.44802 | 169.7 | 2.5E-06 | 22.4 | 0.059 | 11.1 | 1.44638 | 0.00199 | 246.9 | 2.1E+00 | 1.44435 | 4.9E+00 |
| 6 | 2.0 | 0.46 | -0.10 | 17.80 | 35.60 | 21.2 | 0.065 | 13.6 | 1.44991 | 171.0 | 6.4E-12 | 23.5 | 0.063 | 10.8 | 1.44826 | 0.00387 | 239.6 | 9.4E-07 | 1.44615 | 7.1E-14 |
| 7 | 2.0 | 0.50 | -0.10 | 17.90 | 35.80 | 21.1 | 0.065 | 13.6 | 1.45048 | 170.4 | 2.9E-12 | 23.7 | 0.063 | 10.7 | 1.44882 | 0.00443 | 237.6 | 6.5E-09 | 1.44670 | 8.6E-16 |
| 8 | 3.0 | 0.20 | -0.10 | 16.20 | 48.60 | 21.5 | 0.063 | 14.1 | 1.44614 | 171.0 | 2.4E-01 | 18.9 | 0.047 | 12.1 | 1.44453 | 0.00014 | 273.5 | 1.0E+02 | | |
| 9 | 3.0 | 0.23 | -0.10 | 16.70 | 50.10 | 21.5 | 0.064 | 14.1 | 1.44660 | 173.6 | 2.0E-02 | 20.5 | 0.055 | 11.8 | 1.44500 | 0.00061 | 266.3 | 2.1E+01 | | |
| 10 | 3.0 | 0.26 | -0.10 | 17.10 | 51.30 | 21.6 | 0.064 | 14.1 | 1.44705 | 175.6 | 1.3E-03 | 21.4 | 0.057 | 11.6 | 1.44547 | 0.00108 | 262.4 | 4.2E+00 | 1.44355 | 4.0E+01 |
| 11 | 3.0 | 0.29 | -0.10 | 17.50 | 52.50 | 21.6 | 0.064 | 14.1 | 1.44750 | 178.3 | 4.2E-05 | 22.1 | 0.059 | 11.5 | 1.44594 | 0.00155 | 261.4 | 7.1E-01 | 1.44401 | 5.9E+00 |
| 12 | 3.0 | 0.46 | -0.10 | 17.90 | 53.70 | 21.2 | 0.065 | 13.6 | 1.44991 | 170.5 | 1.2E-11 | 23.5 | 0.063 | 10.8 | 1.44828 | 0.00389 | 241.6 | 1.5E-07 | 1.44620 | 6.9E-15 |
| 13 | 3.0 | 0.50 | -0.10 | 18.10 | 54.30 | 21.1 | 0.065 | 13.6 | 1.45049 | 171.4 | 8.3E-13 | 23.7 | 0.063 | 10.8 | 1.44887 | 0.00448 | 241.6 | 1.0E-09 | 1.44679 | 1.1E-16 |
| 14 | 4.0 | 0.20 | -0.10 | 16.00 | 64.00 | 21.5 | 0.063 | 14.1 | 1.44612 | 168.1 | 1.4E-02 | 19.1 | 0.052 | 12.1 | 1.44448 | 0.00009 | 270.7 | 1.1E+02 | | |
| 15 | 4.0 | 0.23 | -0.10 | 16.50 | 66.00 | 21.5 | 0.064 | 14.1 | 1.44658 | 170.6 | 1.2E-03 | 20.5 | 0.055 | 11.9 | 1.44496 | 0.00057 | 263.1 | 5.7E-01 | | |
| 16 | 4.0 | 0.26 | -0.10 | 16.90 | 67.60 | 21.6 | 0.064 | 14.1 | 1.44703 | 172.5 | 1.0E-04 | 21.4 | 0.057 | 11.7 | 1.44542 | 0.00103 | 258.8 | 5.1E-02 | 1.44348 | 3.4E+00 |
| 17 | 4.0 | 0.29 | -0.10 | 17.30 | 69.20 | 21.6 | 0.064 | 14.1 | 1.44748 | 175.2 | 4.7E-06 | 22.1 | 0.059 | 11.6 | 1.44589 | 0.00150 | 257.6 | 4.5E-03 | 1.44394 | 2.0E-01 |
| 18 | 4.0 | 0.46 | -0.10 | 17.70 | 70.80 | 21.2 | 0.065 | 13.6 | 1.44991 | 170.8 | 1.6E-12 | 23.5 | 0.063 | 10.9 | 1.44823 | 0.00384 | 237.6 | 8.8E-10 | 1.44611 | 6.3E-16 |
| 19 | 4.0 | 0.50 | -0.10 | 17.80 | 71.20 | 21.1 | 0.065 | 13.6 | 1.45048 | 170.2 | 4.4E-15 | 23.7 | 0.063 | 10.8 | 1.44879 | 0.00440 | 235.6 | 3.2E-12 | 1.44666 | 3.9E-17 |

FIG.8

| 130 | | | | | FUNDAMENTAL (LP01 MODE) | | | | | HIGHER-ORDER (LP11 MODE) | | | | | | HIGHER-ORDER (LP21 MODE) | |
|---|---|---|---|---|---|---|---|---|---|---|---|---|---|---|---|---|---|
| No. | Ra2 | Δ1 | Δ2 | 2a | 2b | DISPERSION | SLOPE | MFD | neff | Aeff | BENDING LOSS | DISPERSION | SLOPE | MFD | neff | Δn | Aeff | BENDING LOSS | neff | LEAKAGE LOSS |
| | | % | % | μm | μm | ps/nm/km | ps/nm²/km | μm | | μm² | dB/m | ps/nm/km | ps/nm²/km | μm | | | μm² | dB/m | | dB/m |
| 1 | 3.0 | 0.29 | -0.20 | 15.40 | 46.20 | 21.9 | 0.064 | 12.5 | 1.44720 | 138.5 | 3.8E-05 | 22.2 | 0.056 | 10.2 | 1.44520 | 0.00081 | 204.8 | 4.9E-01 | 1.44274 | 1.5E+01 |
| 2 | 3.0 | 0.35 | -0.20 | 15.30 | 45.90 | 21.8 | 0.064 | 12.2 | 1.44802 | 133.4 | 4.9E-08 | 22.9 | 0.058 | 9.9 | 1.44594 | 0.00155 | 194.7 | 6.6E-02 | 1.44335 | 3.7E+00 |
| 3 | 3.0 | 0.39 | -0.20 | 15.60 | 46.80 | 21.8 | 0.064 | 12.2 | 1.44862 | 135.4 | 1.4E-09 | 23.4 | 0.059 | 9.8 | 1.44657 | 0.00218 | 195.4 | 4.4E-03 | 1.44399 | 5.6E-01 |
| 4 | 3.0 | 0.45 | -0.20 | 15.50 | 46.50 | 21.7 | 0.065 | 12.0 | 1.44944 | 131.4 | 8.8E-10 | 23.8 | 0.060 | 9.6 | 1.44733 | 0.00294 | 188.1 | 3.9E-05 | 1.44465 | 1.1E-07 |
| 5 | 3.0 | 0.50 | -0.20 | 15.60 | 46.80 | 21.6 | 0.065 | 12.0 | 1.45015 | 131.3 | 2.1E-11 | 24.2 | 0.061 | 9.5 | 1.44803 | 0.00364 | 186.1 | 7.5E-09 | 1.44532 | 1.4E-11 |
| 6 | 3.0 | 0.29 | -0.15 | 15.00 | 45.00 | 21.7 | 0.064 | 12.5 | 1.44701 | 136.8 | 1.6E-04 | 20.9 | 0.054 | 10.4 | 1.44516 | 0.00077 | 207.6 | 3.2E+00 | 1.44274 | 1.1E+02 |
| 7 | 3.0 | 0.34 | -0.15 | 15.10 | 45.30 | 21.7 | 0.064 | 12.3 | 1.44787 | 134.3 | 7.5E-07 | 21.8 | 0.056 | 10.1 | 1.44582 | 0.00143 | 199.7 | 4.4E-01 | 1.44330 | 2.5E+01 |
| 8 | 3.0 | 0.39 | -0.15 | 15.20 | 45.60 | 21.6 | 0.064 | 12.2 | 1.44860 | 132.6 | 8.3E-10 | 22.6 | 0.058 | 9.9 | 1.44649 | 0.00210 | 194.2 | 2.7E-02 | 1.44389 | 4.0E+00 |
| 9 | 3.0 | 0.44 | -0.15 | 15.30 | 45.90 | 21.6 | 0.065 | 12.1 | 1.44929 | 131.3 | 3.3E-08 | 23.2 | 0.059 | 9.7 | 1.44718 | 0.00279 | 190.1 | 4.1E-04 | 1.44453 | 2.8E-06 |
| 10 | 3.0 | 0.50 | -0.15 | 15.50 | 46.50 | 21.4 | 0.065 | 12.0 | 1.45016 | 131.3 | 9.4E-11 | 23.7 | 0.060 | 9.6 | 1.44805 | 0.00366 | 190.0 | 3.9E-07 | 1.44536 | 2.8E-11 |
| 11 | 3.0 | 0.30 | -0.10 | 14.30 | 42.90 | 21.4 | 0.063 | 12.3 | 1.44724 | 131.6 | 3.3E-04 | 18.8 | 0.049 | 10.5 | 1.44515 | 0.00076 | 207.9 | 6.0E+00 | 1.44279 | 8.8E+02 |
| 12 | 3.0 | 0.33 | -0.10 | 14.90 | 44.70 | 21.4 | 0.064 | 12.5 | 1.44774 | 136.7 | 6.9E-06 | 20.5 | 0.054 | 10.4 | 1.44572 | 0.00133 | 208.0 | 5.4E-01 | 1.44331 | 1.8E+02 |
| 13 | 3.0 | 0.37 | -0.10 | 15.20 | 45.60 | 21.5 | 0.064 | 12.5 | 1.44833 | 137.6 | 2.2E-08 | 21.6 | 0.056 | 10.2 | 1.44632 | 0.00193 | 204.5 | 2.5E-02 | 1.44386 | 2.8E+01 |
| 14 | 3.0 | 0.43 | -0.10 | 15.10 | 45.30 | 21.4 | 0.064 | 12.2 | 1.44914 | 132.3 | 1.3E-10 | 22.3 | 0.058 | 9.9 | 1.44705 | 0.00266 | 193.6 | 2.3E-04 | 1.44444 | 9.2E-05 |
| 15 | 3.0 | 0.50 | -0.10 | 15.30 | 45.90 | 21.3 | 0.065 | 12.0 | 1.45015 | 130.7 | 2.2E-12 | 23.1 | 0.060 | 9.7 | 1.44803 | 0.00364 | 188.9 | 6.5E-08 | 1.44536 | 1.0E-10 |
| 16 | 3.0 | 0.28 | -0.05 | 14.20 | 42.60 | 21.0 | 0.063 | 12.8 | 1.44701 | 138.0 | 8.4E-03 | 16.1 | 0.043 | 11.3 | 1.44504 | 0.00065 | 235.5 | 2.3E+02 | | |
| 17 | 3.0 | 0.32 | -0.05 | 14.50 | 43.50 | 21.2 | 0.063 | 12.6 | 1.44759 | 136.7 | 7.8E-05 | 18.4 | 0.050 | 10.8 | 1.44558 | 0.00119 | 219.9 | 4.1E+01 | | |
| 18 | 3.0 | 0.37 | -0.05 | 14.60 | 43.80 | 21.2 | 0.064 | 12.4 | 1.44828 | 133.0 | 1.1E-07 | 19.9 | 0.053 | 10.4 | 1.44621 | 0.00182 | 205.9 | 2.6E-01 | 1.44380 | 3.9E+02 |
| 19 | 3.0 | 0.42 | -0.05 | 14.70 | 44.10 | 21.2 | 0.064 | 12.2 | 1.44897 | 130.3 | 3.3E-09 | 21.0 | 0.055 | 10.1 | 1.44686 | 0.00247 | 196.5 | 3.6E-03 | 1.44431 | 1.4E+01 |
| 20 | 3.0 | 0.46 | -0.05 | 14.90 | 44.70 | 21.2 | 0.064 | 12.1 | 1.44955 | 130.2 | 5.5E-10 | 21.8 | 0.057 | 9.9 | 1.44743 | 0.00304 | 193.0 | 3.6E-05 | 1.44483 | 3.8E-07 |
| 21 | 3.0 | 0.50 | -0.05 | 15.10 | 45.30 | 21.2 | 0.065 | 12.1 | 1.45014 | 130.5 | 2.6E-10 | 22.4 | 0.059 | 9.8 | 1.44802 | 0.00363 | 190.9 | 2.2E-07 | 1.44538 | 2.8E-10 |

FIG.9

| 150 | | | | | | FUNDAMENTAL (LP01 MODE) | | | | | | HIGHER-ORDER (LP11 MODE) | | | | | | | HIGHER-ORDER (LP21 MODE) | |
|---|---|---|---|---|---|---|---|---|---|---|---|---|---|---|---|---|---|---|---|---|
| No. | Ra2 | Δ1 | Δ2 | 2a | 2b | DISPERSION | SLOPE | MFD | neff | Aeff | BENDING LOSS | DISPERSION | SLOPE | MFD | neff | Δn | Aeff | BENDING LOSS | neff | LEAKAGE LOSS |
| | | % | % | μm | μm | ps/nm/km | ps/nm²/km | μm | | μm² | dB/m | ps/nm/km | ps/nm²/km | μm | | | μm² | dB/m | | dB/m |
| 1 | 3.0 | 0.22 | -0.20 | 16.20 | 48.60 | 21.9 | 0.064 | 13.3 | 1.44634 | 155.3 | 4.2E-03 | 21.8 | 0.056 | 10.9 | 1.44456 | 0.00017 | 231.6 | 4.7E-01 | | |
| 2 | 3.0 | 0.26 | -0.20 | 16.40 | 49.20 | 21.9 | 0.064 | 13.2 | 1.44691 | 154.8 | 2.1E-04 | 22.5 | 0.058 | 10.7 | 1.44513 | 0.00074 | 227.0 | 3.5E-01 | | |
| 3 | 3.0 | 0.30 | -0.20 | 16.60 | 49.80 | 21.9 | 0.064 | 13.1 | 1.44749 | 154.8 | 3.2E-06 | 23.1 | 0.059 | 10.6 | 1.44570 | 0.00131 | 224.2 | 6.6E-02 | 1.44345 | 1.2E+00 |
| 4 | 3.0 | 0.35 | -0.20 | 16.60 | 49.80 | 21.8 | 0.064 | 12.9 | 1.44819 | 151.7 | 1.3E-08 | 23.5 | 0.060 | 10.4 | 1.44636 | 0.00197 | 217.7 | 7.6E-03 | 1.44404 | 1.9E-01 |
| 5 | 3.0 | 0.43 | -0.20 | 16.80 | 50.40 | 21.6 | 0.065 | 12.8 | 1.44933 | 150.5 | 2.8E-08 | 24.0 | 0.062 | 10.2 | 1.44749 | 0.00310 | 213.5 | 9.7E-06 | 1.44513 | 8.3E-11 |
| 6 | 3.0 | 0.47 | -0.20 | 16.90 | 50.70 | 21.5 | 0.065 | 12.8 | 1.44991 | 150.3 | 5.9E-11 | 24.2 | 0.062 | 10.1 | 1.44806 | 0.00367 | 212.1 | 1.0E-07 | 1.44569 | 1.8E-13 |
| 7 | 3.0 | 0.50 | -0.20 | 17.00 | 51.00 | 21.4 | 0.065 | 12.7 | 1.45034 | 150.6 | 3.7E-09 | 24.3 | 0.063 | 10.1 | 1.44849 | 0.00410 | 212.0 | 1.7E-09 | 1.44612 | 1.5E-15 |
| 8 | 3.0 | 0.22 | -0.15 | 15.80 | 47.40 | 21.7 | 0.063 | 13.3 | 1.44632 | 154.7 | 2.3E-02 | 20.3 | 0.052 | 11.2 | 1.44454 | 0.00015 | 237.5 | 3.3E+00 | | |
| 9 | 3.0 | 0.26 | -0.15 | 16.00 | 48.00 | 21.7 | 0.064 | 13.2 | 1.44689 | 153.3 | 9.9E-04 | 21.4 | 0.056 | 10.9 | 1.44509 | 0.00070 | 230.2 | 5.9E-01 | | |
| 10 | 3.0 | 0.30 | -0.15 | 16.30 | 48.90 | 21.7 | 0.064 | 13.2 | 1.44748 | 154.0 | 1.3E-05 | 22.2 | 0.058 | 10.7 | 1.44568 | 0.00129 | 226.0 | 6.8E-02 | | |
| 11 | 3.0 | 0.34 | -0.15 | 16.50 | 49.50 | 21.7 | 0.064 | 13.1 | 1.44806 | 153.9 | 1.1E-07 | 22.8 | 0.059 | 10.6 | 1.44626 | 0.00187 | 223.7 | 4.9E-03 | 1.44400 | 1.4E+00 |
| 12 | 3.0 | 0.43 | -0.15 | 16.70 | 50.10 | 21.5 | 0.065 | 12.9 | 1.44934 | 151.4 | 3.9E-09 | 23.6 | 0.061 | 10.3 | 1.44751 | 0.00312 | 216.2 | 3.0E-05 | 1.44517 | 1.8E-10 |
| 13 | 3.0 | 0.47 | -0.15 | 16.80 | 50.40 | 21.4 | 0.065 | 12.8 | 1.44991 | 150.9 | 1.6E-10 | 23.8 | 0.062 | 10.2 | 1.44807 | 0.00368 | 214.2 | 3.0E-07 | 1.44572 | 4.3E-13 |
| 14 | 3.0 | 0.50 | -0.15 | 16.90 | 50.70 | 21.3 | 0.065 | 12.8 | 1.45034 | 151.0 | 7.1E-09 | 24.0 | 0.062 | 10.1 | 1.44851 | 0.00412 | 213.6 | 4.9E-09 | 1.44615 | 3.9E-15 |
| 15 | 3.0 | 0.22 | -0.10 | 15.30 | 45.90 | 21.4 | 0.063 | 13.4 | 1.44631 | 154.9 | 1.4E-01 | 18.0 | 0.041 | 11.6 | 1.44453 | 0.00014 | 251.8 | 3.0E+01 | | |
| 16 | 3.0 | 0.25 | -0.10 | 15.85 | 47.55 | 21.5 | 0.064 | 13.5 | 1.44677 | 158.4 | 8.7E-03 | 20.0 | 0.053 | 11.4 | 1.44503 | 0.00064 | 245.5 | 4.9E+00 | | |
| 17 | 3.0 | 0.29 | -0.10 | 16.05 | 48.15 | 21.5 | 0.064 | 13.3 | 1.44734 | 156.5 | 1.3E-04 | 21.1 | 0.056 | 11.0 | 1.44557 | 0.00118 | 235.9 | 6.3E-01 | 1.44345 | 8.1E+01 |
| 18 | 3.0 | 0.33 | -0.10 | 16.25 | 48.75 | 21.5 | 0.064 | 13.2 | 1.44792 | 155.5 | 1.4E-06 | 21.9 | 0.058 | 10.8 | 1.44613 | 0.00174 | 229.7 | 4.7E-02 | 1.44394 | 1.5E+01 |
| 19 | 3.0 | 0.43 | -0.10 | 16.50 | 49.50 | 21.4 | 0.065 | 12.9 | 1.44933 | 151.2 | 3.2E-13 | 23.0 | 0.060 | 10.4 | 1.44750 | 0.00311 | 218.0 | 3.9E-06 | 1.44519 | 6.2E-10 |
| 20 | 3.0 | 0.46 | -0.10 | 16.60 | 49.80 | 21.3 | 0.065 | 12.9 | 1.44976 | 150.9 | 1.2E-09 | 23.3 | 0.061 | 10.3 | 1.44793 | 0.00354 | 215.2 | 4.5E-06 | 1.44560 | 6.0E-12 |
| 21 | 3.0 | 0.50 | -0.10 | 16.70 | 50.10 | 21.2 | 0.065 | 12.8 | 1.45034 | 150.3 | 4.2E-08 | 23.5 | 0.062 | 10.2 | 1.44849 | 0.00410 | 214.0 | 1.8E-08 | 1.44614 | 1.5E-14 |
| 22 | 3.0 | 0.22 | -0.05 | 14.60 | 43.80 | 20.9 | 0.063 | 13.6 | 1.44627 | 153.8 | 1.0E+00 | 12.3 | -0.015 | 12.6 | 1.44453 | 0.00014 | 287.2 | 3.1E+01 | | |
| 23 | 3.0 | 0.25 | -0.05 | 15.10 | 45.30 | 21.1 | 0.063 | 13.5 | 1.44673 | 154.6 | 5.8E-02 | 17.1 | 0.046 | 11.9 | 1.44497 | 0.00058 | 260.8 | 2.9E+02 | | |
| 24 | 3.0 | 0.29 | -0.05 | 15.30 | 45.90 | 21.2 | 0.064 | 13.3 | 1.44729 | 151.2 | 8.7E-04 | 19.0 | 0.052 | 11.3 | 1.44548 | 0.00109 | 241.5 | 5.5E+01 | | |
| 25 | 3.0 | 0.33 | -0.05 | 15.60 | 46.80 | 21.3 | 0.064 | 13.1 | 1.44787 | 150.5 | 7.9E-06 | 20.4 | 0.055 | 11.0 | 1.44604 | 0.00165 | 231.3 | 5.3E-01 | | |
| 26 | 3.0 | 0.36 | -0.05 | 16.00 | 48.00 | 21.3 | 0.064 | 13.2 | 1.44833 | 153.0 | 8.6E-08 | 21.3 | 0.057 | 10.9 | 1.44653 | 0.00214 | 229.6 | 2.7E-02 | 1.44434 | 3.3E+00 |
| 27 | 3.0 | 0.46 | -0.05 | 16.40 | 49.20 | 21.2 | 0.065 | 12.9 | 1.44976 | 150.9 | 7.0E-10 | 22.7 | 0.060 | 10.4 | 1.44793 | 0.00354 | 218.6 | 1.6E-05 | 1.44562 | 1.9E-11 |
| 28 | 3.0 | 0.50 | -0.05 | 16.60 | 49.80 | 21.1 | 0.065 | 12.9 | 1.45034 | 151.4 | 3.7E-09 | 23.1 | 0.061 | 10.3 | 1.44851 | 0.00412 | 217.3 | 5.4E-08 | 1.44619 | 2.7E-14 |

FIG.10

| 170 | Ra2 | Δ1 | Δ2 | 2a | 2b | FUNDAMENTAL (LP01 MODE) | | | | | | HIGHER-ORDER (LP11 MODE) | | | | | | HIGHER-ORDER (LP21 MODE) | |
|---|---|---|---|---|---|---|---|---|---|---|---|---|---|---|---|---|---|---|---|
| | | | | | | DISPERSION | SLOPE | MFD | neff | Aeff | BENDING LOSS | DISPERSION | SLOPE | MFD | neff | Δn | Aeff | BENDING LOSS | neff | LEAKAGE LOSS |
| No. | | % | % | μm | μm | ps/nm/km | ps/nm²/km | μm | | μm² | dB/m | ps/nm/km | ps/nm²/km | μm | | | μm² | dB/m | | dB/m |
| 1 | 3.0 | 0.20 | -0.20 | 17.10 | 51.30 | 22.0 | 0.064 | 13.9 | 1.44616 | 170.6 | 5.5E-03 | 22.2 | 0.057 | 11.3 | 1.44473 | 0.00034 | 267.3 | 1.1E+00 | 1.44307 | 2.0E+00 |
| 2 | 3.0 | 0.23 | -0.20 | 17.60 | 52.80 | 22.0 | 0.064 | 14.0 | 1.44663 | 175.3 | 5.6E-04 | 22.8 | 0.059 | 11.3 | 1.44505 | 0.00066 | 255.0 | 2.3E-01 | 1.44361 | 3.8E-01 |
| 3 | 3.0 | 0.27 | -0.20 | 17.80 | 53.40 | 21.9 | 0.064 | 13.9 | 1.44720 | 175.1 | 1.8E-05 | 23.3 | 0.060 | 11.1 | 1.44562 | 0.00123 | 251.8 | 4.3E-02 | 1.44414 | 6.1E-02 |
| 4 | 3.0 | 0.31 | -0.20 | 17.90 | 53.70 | 21.8 | 0.065 | 13.8 | 1.44777 | 173.7 | 2.9E-07 | 23.6 | 0.061 | 11.0 | 1.44617 | 0.00178 | 247.9 | 7.8E-03 | 1.44439 | 7.1E-05 |
| 5 | 3.0 | 0.33 | -0.20 | 17.90 | 53.70 | 21.7 | 0.065 | 13.7 | 1.44833 | 171.2 | 5.7E-06 | 23.7 | 0.061 | 10.9 | 1.44644 | 0.00205 | 245.3 | 2.8E-03 | 1.44617 | 2.1E-16 |
| 6 | 3.0 | 0.46 | -0.20 | 18.20 | 54.60 | 21.4 | 0.065 | 13.5 | 1.44991 | 170.3 | 3.2E-09 | 24.2 | 0.064 | 10.6 | 1.44828 | 0.00389 | 238.8 | 1.1E-08 | 1.44617 | 2.1E-16 |
| 7 | 3.0 | 0.50 | -0.20 | 18.30 | 54.90 | 21.3 | 0.065 | 13.5 | 1.45049 | 170.2 | 3.3E-09 | 24.2 | 0.064 | 10.6 | 1.44885 | 0.00446 | 237.9 | 1.0E-10 | 1.44674 | 1.0E-17 |
| 8 | 3.0 | 0.20 | -0.15 | 16.70 | 50.10 | 21.8 | 0.064 | 14.0 | 1.44615 | 170.3 | 3.3E-02 | 20.9 | 0.055 | 11.6 | 1.44453 | 0.00014 | 259.3 | 9.5E+00 | | |
| 9 | 3.0 | 0.23 | -0.15 | 17.20 | 51.60 | 21.8 | 0.064 | 14.0 | 1.44661 | 174.1 | 3.1E-03 | 21.9 | 0.057 | 11.5 | 1.44500 | 0.00064 | 258.8 | 1.9E+00 | 1.44305 | 1.8E+01 |
| 10 | 3.0 | 0.27 | -0.15 | 17.30 | 51.90 | 21.8 | 0.064 | 13.9 | 1.44718 | 171.5 | 1.0E-04 | 22.5 | 0.059 | 11.2 | 1.44556 | 0.00117 | 250.4 | 3.8E-01 | 1.44355 | 4.0E+00 |
| 11 | 3.0 | 0.30 | -0.15 | 17.70 | 53.10 | 21.7 | 0.064 | 13.9 | 1.44763 | 175.0 | 4.8E-06 | 22.9 | 0.060 | 11.2 | 1.44605 | 0.00166 | 253.0 | 6.8E-02 | 1.44405 | 4.7E-01 |
| 12 | 3.0 | 0.46 | -0.15 | 18.10 | 54.30 | 21.3 | 0.065 | 13.6 | 1.44991 | 171.0 | 5.2E-09 | 23.9 | 0.063 | 10.7 | 1.44829 | 0.00390 | 240.8 | 3.6E-08 | 1.44620 | 6.1E-16 |
| 13 | 3.0 | 0.50 | -0.15 | 18.20 | 54.60 | 21.2 | 0.065 | 13.5 | 1.45049 | 170.7 | 6.4E-09 | 24.0 | 0.064 | 10.7 | 1.44886 | 0.00447 | 239.5 | 3.2E-10 | 1.44676 | 3.2E-17 |
| 14 | 3.0 | 0.20 | -0.10 | 16.20 | 48.60 | 21.5 | 0.063 | 14.1 | 1.44614 | 171.0 | 2.4E-01 | 18.9 | 0.047 | 12.1 | 1.44453 | 0.00014 | 273.5 | 1.0E+02 | | |
| 15 | 3.0 | 0.23 | -0.10 | 16.70 | 50.10 | 21.5 | 0.063 | 14.1 | 1.44660 | 173.6 | 2.0E-02 | 20.5 | 0.055 | 11.8 | 1.44500 | 0.00061 | 266.3 | 2.1E+01 | | |
| 16 | 3.0 | 0.26 | -0.10 | 17.10 | 51.30 | 21.6 | 0.064 | 14.1 | 1.44705 | 175.6 | 1.3E-03 | 21.4 | 0.057 | 11.6 | 1.44547 | 0.00108 | 262.4 | 4.2E+00 | 1.44355 | 4.0E+01 |
| 17 | 3.0 | 0.29 | -0.10 | 17.50 | 52.50 | 21.6 | 0.064 | 14.1 | 1.44750 | 178.3 | 4.2E-05 | 22.1 | 0.059 | 11.5 | 1.44594 | 0.00155 | 261.4 | 7.1E-01 | 1.44401 | 5.9E+00 |
| 18 | 3.0 | 0.46 | -0.10 | 17.90 | 53.70 | 21.2 | 0.065 | 13.6 | 1.44991 | 170.5 | 1.2E-11 | 23.5 | 0.063 | 10.8 | 1.44823 | 0.00384 | 237.6 | 1.5E-07 | 1.44620 | 6.9E-15 |
| 19 | 3.0 | 0.50 | -0.10 | 18.10 | 54.30 | 21.1 | 0.065 | 13.6 | 1.45049 | 171.4 | 8.3E-13 | 23.7 | 0.063 | 10.8 | 1.44879 | 0.00440 | 235.6 | 1.0E-09 | 1.44679 | 1.1E-16 |
| 20 | 3.0 | 0.20 | -0.05 | 15.50 | 46.50 | 21.1 | 0.063 | 14.3 | 1.44612 | 170.7 | 2.1E+00 | 14.6 | 0.017 | 13.0 | 1.44454 | 0.00015 | 309.1 | 2.8E+02 | | |
| 21 | 3.0 | 0.22 | -0.05 | 16.30 | 48.90 | 21.2 | 0.063 | 14.4 | 1.44646 | 177.4 | 2.9E-01 | 18.2 | 0.050 | 12.6 | 1.44493 | 0.00054 | 293.5 | 7.3E+01 | | |
| 22 | 3.0 | 0.26 | -0.05 | 16.40 | 49.20 | 21.3 | 0.063 | 14.1 | 1.44701 | 171.3 | 9.0E-03 | 19.7 | 0.054 | 12.0 | 1.44541 | 0.00102 | 270.1 | 6.5E+01 | | |
| 23 | 3.0 | 0.29 | -0.05 | 16.70 | 50.10 | 21.4 | 0.064 | 14.0 | 1.44745 | 171.3 | 2.8E-04 | 20.7 | 0.056 | 11.7 | 1.44584 | 0.00145 | 261.9 | 1.2E+01 | 1.44393 | 1.5E+02 |
| 24 | 3.0 | 0.32 | -0.05 | 17.10 | 51.30 | 21.4 | 0.064 | 14.0 | 1.44790 | 173.5 | 7.1E-06 | 21.5 | 0.058 | 11.5 | 1.44631 | 0.00192 | 259.0 | 1.5E+00 | 1.44437 | 3.7E-01 |
| 25 | 3.0 | 0.44 | -0.05 | 17.60 | 52.80 | 21.2 | 0.065 | 13.7 | 1.44962 | 170.2 | 1.2E-08 | 22.9 | 0.062 | 11.0 | 1.44799 | 0.00360 | 244.2 | 1.1E-05 | 1.44592 | 7.0E-13 |
| 26 | 3.0 | 0.47 | -0.05 | 17.80 | 53.40 | 21.1 | 0.065 | 13.7 | 1.45006 | 171.2 | 1.8E-09 | 23.1 | 0.062 | 10.9 | 1.44844 | 0.00405 | 244.1 | 1.2E-07 | 1.44641 | 1.2E-16 |
| 27 | 3.0 | 0.50 | -0.05 | 17.90 | 53.70 | 21.0 | 0.065 | 13.6 | 1.45049 | 171.0 | 3.4E-09 | 23.3 | 0.063 | 10.8 | 1.44886 | 0.00447 | 242.5 | 4.1E-09 | 1.44679 | 4.0E-16 |

PROFILE: Δ1=0.33%, Δ2=-0.1%, Ra=2.0, 2a=17.2 μm

|  | DISPERSION | SLOPE | Aeff | neff | BENDING LOSS |
|---|---|---|---|---|---|
|  | [ps/nm/km] | [ps/nm²/km] | [μm²] |  | [dB/m] |
| LP01 MODE | 21.53 | 0.064 | 169.7 | 1.44802 | 0.00000254 |
| LP11 MODE | 22.40 | 0.059 | 246.9 | 1.44639 | 2.08 |
| LP21 MODE | LEKAGE LOSS=4.88 [dB/m] | | 319.3 | 1.44435 | |

|  | LEKAGE LOSS | Aeff | neff | BENDING LOSS |
|---|---|---|---|---|
|  | [dB/m] | [μm²] |  | [dB/m] |
| LP01 MODE | 5.9 E-28 | 167.6 | 1.44801 | 0.0000035 |
| LP11 MODE | 9.4 E-24 | 245.5 | 1.44635 | 0.16 |
| LP21 MODE | 33.3 | 401.5 | 1.44300 |  |

| | MODE | TRANSMISSION LOSS [dB/km] | DISPERSION [ps/nm/km] | Aeff [$\mu m^2$] | BENDING LOSS [dB/m] |
|---|---|---|---|---|---|
| FIRST EXAMPLE | LP01 | 0.212 | 22.8 | 162.5 | 0.04 |
| | LP11 | 0.370 | 21.1 | 242.3 | 3.32 |
| SECOND EXAMPLE | LP01 | 0.193 | 22.9 | 167.6 | 0.08 |
| | LP11 | 0.333 | 20.8 | 244.7 | 3.22 |

FIG. 28

| No. | Ra2 | Ra3 | Δ1 % | Δ2 % | Δ3 % | 2a μm | 2b μm | 2c μm | FUNDAMENTAL (LP01 MODE) ||||| HIGHER-ORDER (LP11 MODE) ||||| HIGHER-ORDER (LP21 MODE) |||||
|---|---|---|---|---|---|---|---|---|---|---|---|---|---|---|---|---|---|---|---|---|---|---|
| | | | | | | | | | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m |
| 130-1 | 2 | 3 | 0.30 | 0 | -0.5 | 13.2 | 26.4 | 39.6 | 1.447177 | 4.45E-21 | 130.0 | 12.7 | 4.60E-05 | 1.445091 | 5.21E-10 | 229.1 | 17.4 | 3.06E-01 | 1.442883 | 1.02E-01 | 385.2 | 24.4 | 3.98E-01 |
| 130-2 | 2 | 3 | 0.30 | 0 | -0.4 | 13.2 | 26.4 | 39.6 | 1.447178 | 8.91E-21 | 130.1 | 12.7 | 9.89E-05 | 1.445091 | 1.15E-09 | 230.6 | 17.5 | 8.33E-01 | 1.442910 | 2.77E+01 | 404.4 | 27.4 | 1.35E+02 |
| 130-3 | 2 | 3 | 0.30 | 0 | -0.3 | 13.2 | 26.4 | 39.6 | 1.447178 | 9.89E-23 | 130.2 | 12.7 | 2.43E-04 | 1.445099 | 2.07E-10 | 232.7 | 17.6 | 2.78E+00 | 1.442949 | 8.76E+01 | 449.5 | 38.5 | 2.02E+02 |
| 130-4 | 2 | 3 | 0.30 | 0 | -0.2 | 13.2 | 26.4 | 39.6 | 1.447178 | 1.67E-22 | 130.4 | 12.7 | 6.40E-04 | 1.445106 | 5.52E-10 | 235.9 | 17.8 | 1.48E+01 | 1.443013 | 3.40E+02 | 610.5 | 64.5 | 5.86E+02 |
| 130-5 | 2 | 3 | 0.30 | 0 | -0.1 | 13.2 | 26.4 | 39.6 | 1.447179 | 4.99E-22 | 130.6 | 12.7 | 1.96E-03 | 1.445116 | 1.72E-09 | 241.9 | 18.1 | 1.31E+02 | 1.443140 | 1.74E-03 | 2425.9 | 134.6 | 3.12E+03 |
| 130-6 | 2 | 4 | 0.30 | 0 | -0.5 | 13.1 | 26.2 | 52.4 | 1.447161 | 4.70E-22 | 128.8 | 12.6 | 2.60E-07 | 1.445055 | 3.16E-12 | 227.9 | 17.4 | 3.67E-04 | 1.442837 | 1.43E-02 | 381.4 | 22.8 | 1.67E-01 |
| 130-7 | 2 | 4 | 0.30 | 0 | -0.4 | 13.1 | 26.2 | 52.4 | 1.447161 | 1.38E-21 | 128.9 | 12.6 | 1.13E-06 | 1.445059 | 1.57E-11 | 229.5 | 17.4 | 2.37E-03 | 1.442865 | 9.21E-02 | 395.9 | 23.2 | 1.57E+00 |
| 130-8 | 2 | 4 | 0.30 | 0 | -0.3 | 13.1 | 26.2 | 52.4 | 1.447162 | 1.72E-23 | 129.0 | 12.6 | 6.62E-06 | 1.445064 | 7.29E-12 | 231.7 | 17.5 | 2.30E-02 | 1.442906 | 9.17E-01 | 405.8 | 24.2 | 5.74E+00 |
| 130-9 | 2 | 4 | 0.30 | 0 | -0.2 | 13.1 | 26.2 | 52.4 | 1.447162 | 8.03E-23 | 129.2 | 12.7 | 4.63E-05 | 1.445072 | 5.26E-11 | 255.1 | 17.7 | 4.62E-01 | 1.442973 | 1.09E+01 | 473.9 | 27.3 | 5.35E+01 |
| 130-10 | 2 | 4 | 0.30 | 0 | -0.1 | 13.1 | 26.2 | 52.0 | 1.447163 | 3.59E-22 | 129.4 | 12.7 | 4.58E-04 | 1.445083 | 5.50E-10 | 241.2 | 18.1 | 2.15E+01 | 1.443125 | 3.33E+02 | 856.1 | 66.1 | 2.15E+03 |
| 130-11 | 2 | 5 | 0.30 | 0 | -0.5 | 13.1 | 26.2 | 65.5 | 1.447161 | 1.30E-23 | 128.8 | 12.6 | 5.86E-09 | 1.445056 | 1.11E-14 | 228.0 | 17.4 | 4.54E-07 | 1.442837 | 1.71E-05 | 381.5 | 22.8 | 8.57E-04 |
| 130-12 | 2 | 5 | 0.30 | 0 | -0.4 | 13.0 | 26.0 | 65.0 | 1.447144 | 6.58E-23 | 127.7 | 12.6 | 7.62E-09 | 1.445025 | 2.22E-13 | 228.6 | 17.4 | 9.83E-06 | 1.442820 | 3.53E-04 | 395.2 | 23.1 | 3.03E-02 |
| 130-13 | 2 | 5 | 0.30 | 0 | -0.3 | 13.0 | 26.0 | 65.0 | 1.447145 | 2.29E-24 | 127.8 | 12.6 | 1.07E-07 | 1.445030 | 2.57E-13 | 230.9 | 17.5 | 2.63E-04 | 1.442863 | 8.84E-03 | 418.1 | 23.8 | 3.42E-01 |
| 130-14 | 2 | 5 | 0.30 | 0 | -0.2 | 13.0 | 26.0 | 65.0 | 1.447145 | 2.60E-23 | 128.0 | 12.6 | 2.07E-06 | 1.445038 | 4.97E-12 | 234.5 | 17.7 | 2.01E-02 | 1.442933 | 4.40E-01 | 472.1 | 25.3 | 3.61E+01 |
| 130-15 | 2 | 5 | 0.30 | 0 | -0.1 | 13.0 | 26.0 | 65.0 | 1.447146 | 2.70E-22 | 128.2 | 12.6 | 7.38E-05 | 1.445049 | 1.73E-10 | 240.9 | 18.1 | 7.11E+00 | 1.443101 | 8.88E+01 | 762.2 | 43.9 | 3.70E+03 |
| 130-16 | 3 | 4 | 0.30 | 0 | -0.5 | 13.0 | 39.0 | 52.0 | 1.447147 | 7.91E-21 | 128.6 | 12.6 | 3.32E-05 | 1.445070 | 6.39E-10 | 254.7 | 18.8 | 1.33E-01 | 1.443377 | 4.37E+00 | 935.7 | 34.6 | 1.42E+01 |
| 130-17 | 3 | 4 | 0.30 | 0 | -0.4 | 13.0 | 39.0 | 52.0 | 1.447147 | 1.50E-20 | 128.6 | 12.7 | 7.56E-05 | 1.445070 | 1.49E-09 | 255.0 | 18.8 | 3.60E-01 | 1.443392 | 1.20E+01 | 969.0 | 36.0 | 4.03E+01 |
| 130-18 | 3 | 4 | 0.30 | 0 | -0.3 | 13.0 | 39.0 | 52.0 | 1.447147 | 1.58E-22 | 128.6 | 12.7 | 1.96E-04 | 1.445071 | 3.03E-10 | 255.5 | 18.9 | 1.13E+00 | 1.443413 | 3.99E+01 | 1038.9 | 41.7 | 1.35E+02 |
| 130-19 | 3 | 4 | 0.30 | 0 | -0.2 | 13.0 | 39.0 | 52.0 | 1.447147 | 3.31E-21 | 128.6 | 12.7 | 5.58E-04 | 1.445071 | 9.07E-10 | 256.2 | 18.9 | 4.67E+00 | 1.443450 | 1.65E+02 | 1254.0 | 58.4 | 5.69E+02 |
| 130-20 | 3 | 4 | 0.30 | 0 | -0.1 | 13.0 | 39.0 | 52.0 | 1.447147 | 7.41E-22 | 128.6 | 12.7 | 1.94E-03 | 1.445072 | 3.44E-09 | 257.4 | 19.1 | 3.21E+01 | 1.443531 | 9.86E+02 | 2270.9 | 107.7 | 3.22E+03 |
| 130-21 | 3 | 5 | 0.30 | 0 | -0.5 | 13.0 | 39.0 | 65.0 | 1.447147 | 6.28E-22 | 128.6 | 12.7 | 7.71E-08 | 1.445070 | 2.23E-12 | 254.7 | 18.8 | 1.68E-04 | 1.443377 | 4.38E-03 | 932.3 | 34.0 | 3.16E-02 |
| 130-22 | 3 | 5 | 0.30 | 0 | -0.4 | 13.0 | 39.0 | 65.0 | 1.447147 | 1.84E-21 | 128.6 | 12.7 | 4.01E-07 | 1.445070 | 1.18E-11 | 255.0 | 18.8 | 1.04E-03 | 1.443391 | 2.77E-02 | 959.7 | 34.5 | 2.40E-01 |
| 130-23 | 3 | 5 | 0.30 | 0 | -0.3 | 13.0 | 39.0 | 65.0 | 1.447147 | 3.76E-23 | 128.6 | 12.7 | 2.60E-06 | 1.445071 | 5.81E-12 | 255.5 | 18.9 | 8.88E-03 | 1.443412 | 2.28E-01 | 1002.5 | 35.3 | 2.50E+00 |
| 130-24 | 3 | 5 | 0.30 | 0 | -0.2 | 13.0 | 39.0 | 65.0 | 1.447147 | 1.30E-22 | 128.6 | 12.7 | 2.11E-05 | 1.445071 | 4.73E-11 | 256.2 | 18.9 | 1.25E-01 | 1.443448 | 3.05E+00 | 1085.4 | 37.2 | 5.34E+01 |
| 130-25 | 4 | 4 | 0.30 | 0 | -0.5 | 13.0 | 52.0 | 65.0 | 1.447147 | 1.57E-20 | 128.6 | 12.7 | 1.32E-05 | 1.445074 | 5.74E-10 | 259.9 | 19.3 | 3.26E-01 | 1.443720 | 2.06E+00 | 1698.1 | 47.7 | 1.73E+01 |

FIG.29

| No. | Ra2 | Ra3 | Δ1 % | Δ2 % | Δ3 % | 2a μm | 2b μm | 2c μm | neff | FUNDAMENTAL (LP01 MODE) LEAKAGE LOSS dB/m | Aeff μm² | MFD μm | BENDING LOSS dB/m | HIGHER-ORDER (LP11 MODE) neff | LEAKAGE LOSS dB/m | Aeff μm² | MFD μm | BENDING LOSS dB/m | HIGHER-ORDER (LP21 MODE) neff | LEAKAGE LOSS dB/m | Aeff μm² | MFD μm | BENDING LOSS dB/m |
|---|---|---|---|---|---|---|---|---|---|---|---|---|---|---|---|---|---|---|---|---|---|---|---|
| 150-1 | 2 | 3 | 0.30 | 0 | -0.5 | 14.8 | 29.6 | 44.4 | 1.447409 | 1.46E-21 | 150.6 | 13.6 | 5.01E-06 | 1.445591 | 3.16E-13 | 247.7 | 18.1 | 2.05E-02 | 1.443557 | 1.06E+00 | 388.2 | 23.6 | 5.77E+00 |
| 150-2 | 2 | 3 | 0.30 | 0 | -0.4 | 14.8 | 29.6 | 44.4 | 1.447409 | 2.87E-21 | 150.7 | 13.6 | 1.19E-05 | 1.445592 | 7.66E-13 | 248.4 | 18.2 | 5.67E-02 | 1.443569 | 3.15E+00 | 397.5 | 24.3 | 2.22E+01 |
| 150-3 | 2 | 3 | 0.30 | 0 | -0.3 | 14.8 | 29.6 | 44.4 | 1.447409 | 2.72E-23 | 150.7 | 13.6 | 3.04E-05 | 1.445594 | 7.42E-14 | 249.3 | 18.2 | 1.86E-01 | 1.443585 | 1.08E+01 | 414.2 | 27.1 | 7.28E+01 |
| 150-4 | 2 | 3 | 0.30 | 0 | -0.2 | 14.8 | 29.6 | 44.4 | 1.447409 | 6.14E-23 | 150.8 | 13.6 | 8.85E-05 | 1.445596 | 2.26E-13 | 250.6 | 18.3 | 7.34E-01 | 1.443611 | 4.81E+01 | 457.1 | 36.3 | 2.02E+02 |
| 150-5 | 2 | 3 | 0.30 | 0 | -0.1 | 14.8 | 29.6 | 44.4 | 1.447409 | 1.88E-22 | 150.9 | 13.6 | 3.06E-04 | 1.445599 | 8.03E-13 | 252.8 | 18.4 | 4.47E+00 | 1.443664 | 3.30E+02 | 727.3 | 74.9 | 1.02E+03 |
| 150-6 | 2 | 4 | 0.30 | 0 | -0.5 | 14.6 | 29.2 | 58.4 | 1.447383 | 7.07E-23 | 147.9 | 13.4 | 1.38E-08 | 1.445533 | 1.74E-15 | 245.1 | 18.0 | 1.50E-05 | 1.443478 | 5.80E-04 | 388.0 | 23.3 | 9.78E-03 |
| 150-7 | 2 | 4 | 0.30 | 0 | -0.4 | 14.6 | 29.2 | 58.4 | 1.447383 | 3.31E-22 | 148.0 | 13.4 | 8.30E-08 | 1.445535 | 1.09E-14 | 245.8 | 18.1 | 9.91E-05 | 1.443491 | 4.23E-03 | 397.2 | 23.6 | 1.23E-01 |
| 150-8 | 2 | 5 | 0.30 | 0 | -0.5 | 14.6 | 29.2 | 73.0 | 1.447383 | 1.95E-24 | 147.9 | 13.4 | 1.58E-11 | 1.445533 | 5.08E-18 | 245.2 | 18.1 | 7.46E-09 | 1.443478 | 3.02E-07 | 388.1 | 23.6 | 2.21E-05 |
| 150-9 | 2 | 5 | 0.30 | 0 | -0.4 | 14.6 | 29.2 | 73.0 | 1.447383 | 1.57E-23 | 148.0 | 13.4 | 2.30E-10 | 1.445535 | 7.50E-17 | 245.9 | 18.1 | 1.30E-07 | 1.443491 | 3.83E-06 | 397.2 | 23.6 | 9.56E-04 |

FIG. 30

| No. | Ra2 | Ra3 | Δ1 % | Δ2 % | Δ3 % | 2a μm | 2b μm | 2c μm | FUNDAMENTAL (LP01 MODE) neff | LEAKAGE LOSS dB/m | Aeff μm² | MFD μm | BENDING LOSS dB/m | HIGHER-ORDER (LP11 MODE) neff | LEAKAGE LOSS dB/m | Aeff μm² | MFD μm | BENDING LOSS dB/m | HIGHER-ORDER (LP21 MODE) neff | LEAKAGE LOSS dB/m | Aeff μm² | MFD μm | BENDING LOSS dB/m |
|---|---|---|---|---|---|---|---|---|---|---|---|---|---|---|---|---|---|---|---|---|---|---|---|
| 170-1 | 2 | 3 | 0.25 | 0 | -0.5 | 15.5 | 31.0 | 46.5 | 1.446832 | 4.16E-20 | 170.32 | 14.45 | 2.27E-04 | 1.445229 | 3.37E-11 | 286.7 | 19.5 | 4.51E-02 | 1.443467 | 8.77E-01 | 456.7 | 25.3 | 4.90E+00 |
| 170-2 | 2 | 3 | 0.25 | 0 | -0.4 | 15.5 | 31.0 | 46.5 | 1.446832 | 8.46E-20 | 170.40 | 14.45 | 5.95E-04 | 1.445230 | 8.74E-11 | 287.8 | 19.6 | 1.35E-01 | 1.443480 | 2.74E+00 | 468.7 | 26.0 | 1.31E+01 |
| 170-3 | 2 | 3 | 0.25 | 0 | -0.3 | 15.5 | 31.0 | 46.5 | 1.446833 | 2.00E-19 | 170.49 | 14.46 | 1.74E-03 | 1.445233 | 2.52E-10 | 289.3 | 19.6 | 4.74E-01 | 1.443498 | 1.02E+01 | 489.7 | 27.8 | 3.91E+01 |
| 170-4 | 2 | 3 | 0.25 | 0 | -0.2 | 15.5 | 31.0 | 46.5 | 1.446833 | 5.21E-19 | 170.61 | 14.47 | 5.93E-03 | 1.445236 | 8.39E-10 | 291.5 | 19.7 | 2.17E+00 | 1.443527 | 5.02E+01 | 542.3 | 35.1 | 1.60E+02 |
| 170-5 | 2 | 3 | 0.25 | 0 | -0.1 | 15.5 | 31.0 | 46.5 | 1.446833 | 1.64E-18 | 170.78 | 14.49 | 2.57E-02 | 1.445240 | 3.52E-09 | 295.4 | 19.9 | 2.07E+01 | 1.443589 | 4.01E+02 | 851.4 | 69.7 | 1.25E+03 |
| 170-6 | 2 | 4 | 0.25 | 0 | -0.5 | 15.3 | 30.6 | 61.2 | 1.446810 | 3.35E-21 | 167.48 | 14.33 | 1.68E-07 | 1.445181 | 8.63E-14 | 283.9 | 19.5 | 2.14E-05 | 1.443402 | 3.47E-04 | 455.2 | 25.1 | 4.94E-03 |
| 170-7 | 2 | 4 | 0.25 | 0 | -0.4 | 15.3 | 30.6 | 61.2 | 1.446811 | 1.06E-20 | 167.56 | 14.34 | 1.22E-06 | 1.445183 | 6.33E-13 | 285.1 | 19.5 | 1.61E-04 | 1.443416 | 2.79E-03 | 467.2 | 25.4 | 3.60E-02 |
| 170-8 | 2 | 4 | 0.25 | 0 | -0.3 | 15.3 | 30.6 | 61.2 | 1.446811 | 3.78E-20 | 167.66 | 14.35 | 1.07E-05 | 1.445186 | 5.35E-12 | 286.8 | 19.5 | 1.70E-03 | 1.443436 | 3.17E-02 | 486.0 | 25.9 | 3.34E-01 |
| 170-9 | 2 | 4 | 0.25 | 0 | -0.2 | 15.3 | 30.6 | 61.2 | 1.446811 | 1.54E-19 | 167.80 | 14.36 | 1.28E-04 | 1.445189 | 5.81E-11 | 289.2 | 19.7 | 3.12E-02 | 1.443468 | 6.14E-01 | 522.2 | 26.9 | 6.69E+00 |
| 170-10 | 2 | 4 | 0.25 | 0 | -0.1 | 15.3 | 30.6 | 61.2 | 1.446811 | 8.21E-19 | 167.98 | 14.38 | 2.63E-03 | 1.445191 | 1.03E-09 | 294.2 | 19.9 | 7.04E+00 | 1.443537 | 3.28E+01 | 653.9 | 34.9 | 9.21E+02 |
| 170-11 | 2 | 5 | 0.25 | 0 | -0.5 | 15.3 | 30.6 | 76.5 | 1.446810 | 2.30E-23 | 167.48 | 14.33 | 6.69E-11 | 1.445181 | 1.27E-16 | 284.0 | 19.4 | 8.61E-09 | 1.443402 | 8.79E-08 | 455.3 | 25.1 | 7.64E-06 |
| 170-12 | 2 | 5 | 0.25 | 0 | -0.4 | 15.3 | 30.6 | 76.5 | 1.446811 | 1.74E-22 | 167.56 | 14.34 | 1.24E-09 | 1.445183 | 2.39E-15 | 285.2 | 19.5 | 1.86E-07 | 1.443416 | 1.94E-06 | 467.2 | 25.4 | 1.86E-04 |
| 170-13 | 2 | 5 | 0.25 | 0 | -0.3 | 15.3 | 30.6 | 76.5 | 1.446811 | 1.57E-21 | 167.66 | 14.35 | 3.25E-08 | 1.445186 | 5.69E-14 | 286.9 | 19.5 | 6.84E-06 | 1.443436 | 7.03E-05 | 486.0 | 25.9 | 6.82E-03 |
| 170-14 | 2 | 5 | 0.25 | 0 | -0.2 | 15.3 | 30.6 | 76.5 | 1.446811 | 1.89E-20 | 167.80 | 14.36 | 1.41E-06 | 1.445189 | 1.99E-12 | 289.3 | 19.7 | 6.31E-04 | 1.443468 | 5.63E-03 | 521.9 | 26.8 | 1.01E+00 |
| 170-15 | 2 | 5 | 0.25 | 0 | -0.1 | 15.3 | 30.6 | 76.5 | 1.446811 | 3.49E-19 | 167.98 | 14.38 | 1.57E-04 | 1.445194 | 1.37E-10 | 293.6 | 19.9 | 3.38E+00 | 1.443576 | 6.87E+00 | 741.9 | 35.9 | 1.16E+03 |
| 170-16 | 2 | 3 | 0.25 | 0 | -0.5 | 16.2 | 32.4 | 48.6 | 1.447571 | 5.20E-22 | 170.39 | 14.36 | 1.09E-06 | 1.445955 | 2.50E-15 | 267.8 | 18.9 | 2.33E-03 | 1.444073 | 1.07E-01 | 384.6 | 23.7 | 1.06E+00 |
| 170-17 | 2 | 3 | 0.30 | 0 | -0.4 | 16.2 | 32.4 | 48.6 | 1.447571 | 1.37E-21 | 170.42 | 14.36 | 2.81E-06 | 1.445956 | 6.44E-15 | 268.2 | 18.9 | 6.80E-03 | 1.444078 | 3.38E-01 | 389.3 | 24.0 | 2.54E+00 |
| 170-18 | 2 | 3 | 0.30 | 0 | -0.3 | 16.2 | 32.4 | 48.6 | 1.447571 | 3.10E-21 | 170.45 | 14.36 | 7.91E-06 | 1.445956 | 1.82E-14 | 268.6 | 18.9 | 2.28E-02 | 1.444080 | 1.27E+00 | 396.8 | 24.6 | 1.08E+01 |
| 170-19 | 2 | 3 | 0.30 | 0 | -0.2 | 16.2 | 32.4 | 48.6 | 1.447571 | 8.91E-21 | 170.48 | 14.36 | 2.53E-05 | 1.445957 | 5.81E-14 | 269.2 | 18.9 | 9.47E-02 | 1.444095 | 5.93E+00 | 411.4 | 26.7 | 6.52E+01 |
| 170-20 | 2 | 3 | 0.30 | 0 | -0.1 | 16.2 | 32.4 | 48.6 | 1.447572 | 2.61E-20 | 170.53 | 14.37 | 9.72E-05 | 1.445958 | 2.24E-13 | 270.1 | 19.0 | 5.65E-01 | 1.444115 | 4.45E+01 | 473.7 | 41.2 | 7.38E+02 |

FIG.31

| No. | Ra2 | Ra3 | Δ1 % | Δ2 % | Δ3 % | 2a μm | 2b μm | 2c μm | FUNDAMENTAL (LP01 MODE) ||||| HIGHER-ORDER (LP11 MODE) ||||| HIGHER-ORDER (LP21 MODE) ||||
|---|---|---|---|---|---|---|---|---|---|---|---|---|---|---|---|---|---|---|---|---|---|---|
| | | | | | | | | | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m |
| 170-21 | 2 | 4 | 0.30 | 0 | -0.5 | 16.0 | 32.0 | 64.0 | 1.447550 | 3.36E-23 | 167.47 | 14.24 | 1.30E-09 | 1.445906 | 6.76E-18 | 264.7 | 18.8 | 1.04E-06 | 1.444003 | 2.27E-05 | 385.0 | 23.6 | 6.89E-04 |
| 170-22 | 2 | 4 | 0.30 | 0 | -0.4 | 16.0 | 32.0 | 64.0 | 1.447550 | 1.45E-22 | 167.49 | 14.24 | 1.00E-08 | 1.445907 | 5.55E-17 | 265.1 | 18.8 | 7.27E-06 | 1.444008 | 1.77E-04 | 389.9 | 23.8 | 4.98E-03 |
| 170-23 | 2 | 4 | 0.30 | 0 | -0.3 | 16.0 | 32.0 | 64.0 | 1.447550 | 5.21E-22 | 167.53 | 14.25 | 8.76E-08 | 1.445908 | 4.89E-16 | 265.6 | 18.8 | 7.03E-05 | 1.444016 | 1.96E-03 | 397.2 | 24.0 | 7.91E-02 |
| 170-24 | 2 | 4 | 0.30 | 0 | -0.2 | 16.0 | 32.0 | 64.0 | 1.447550 | 3.27E-21 | 167.57 | 14.25 | 9.67E-07 | 1.445909 | 5.15E-15 | 266.2 | 18.8 | 1.08E-03 | 1.444023 | 3.63E-02 | 410.2 | 24.5 | 2.86E+00 |
| 170-25 | 2 | 4 | 0.30 | 0 | -0.1 | 16.0 | 32.0 | 64.0 | 1.447550 | 2.05E-20 | 167.62 | 14.26 | 1.59E-05 | 1.445907 | 7.84E-14 | 267.7 | 18.9 | 3.75E-02 | 1.444050 | 1.73E+00 | 441.1 | 26.1 | 2.19E+02 |
| 170-26 | 2 | 5 | 0.30 | 0 | -0.5 | 16.0 | 32.0 | 80.0 | 1.447550 | 1.25E-24 | 167.47 | 14.24 | 7.18E-13 | 1.445907 | 1.63E-20 | 264.7 | 18.8 | 2.38E-10 | 1.444003 | 2.43E-09 | 385.0 | 23.6 | 7.32E-07 |
| 170-27 | 2 | 5 | 0.30 | 0 | -0.4 | 16.0 | 32.0 | 80.0 | 1.447550 | 7.42E-24 | 167.49 | 14.24 | 1.44E-11 | 1.445907 | 1.14E-19 | 265.1 | 18.8 | 4.71E-09 | 1.444008 | 5.26E-08 | 389.9 | 23.8 | 1.31E-05 |
| 170-28 | 2 | 5 | 0.30 | 0 | -0.3 | 16.0 | 32.0 | 80.0 | 1.448302 | 5.27E-23 | 170.43 | 14.30 | 3.76E-10 | 1.445908 | 7.64E-18 | 265.6 | 18.8 | 1.53E-07 | 1.444016 | 1.84E-06 | 397.2 | 24.0 | 9.94E-04 |
| 170-29 | 2 | 5 | 0.30 | 0 | -0.2 | 16.0 | 32.0 | 80.0 | 1.447550 | 1.54E-22 | 167.57 | 14.25 | 1.50E-08 | 1.445909 | 2.55E-16 | 266.2 | 18.8 | 1.04E-05 | 1.444028 | 1.32E-04 | 409.7 | 24.4 | 3.73E-01 |
| 170-30 | 2 | 5 | 0.30 | 0 | -0.1 | 16.0 | 32.0 | 80.0 | 1.447550 | 3.37E-21 | 167.62 | 14.26 | 1.25E-06 | 1.445910 | 1.42E-14 | 267.3 | 18.9 | 2.91E-03 | 1.444050 | 3.78E-02 | 439.9 | 25.5 | 3.07E+02 |
| 170-31 | 2 | 3 | 0.35 | 0 | -0.5 | 16.7 | 33.4 | 50.1 | 1.448302 | 9.23E-24 | 170.42 | 14.30 | 1.88E-09 | 1.446678 | 1.34E-18 | 256.8 | 18.5 | 4.79E-05 | 1.444713 | 4.14E-10 | 332.6 | 22.4 | 1.32E-01 |
| 170-32 | 2 | 3 | 0.35 | 0 | -0.4 | 16.7 | 33.4 | 50.1 | 1.448302 | 2.51E-23 | 170.42 | 14.30 | 4.73E-09 | 1.446678 | 3.39E-18 | 256.9 | 18.5 | 1.33E-04 | 1.444715 | 3.24E-10 | 334.1 | 22.4 | 4.72E-01 |
| 170-33 | 2 | 3 | 0.35 | 0 | -0.3 | 16.7 | 33.4 | 50.1 | 1.448302 | 5.27E-23 | 170.43 | 14.30 | 1.29E-08 | 1.446678 | 9.29E-18 | 257.1 | 18.5 | 4.19E-04 | 1.444717 | 7.51E-10 | 336.1 | 22.5 | 2.13E+00 |
| 170-34 | 2 | 3 | 0.35 | 0 | -0.2 | 16.7 | 33.4 | 50.1 | 1.448302 | 7.14E-23 | 170.45 | 14.30 | 3.90E-08 | 1.446679 | 2.83E-17 | 257.2 | 18.5 | 1.55E-03 | 1.444721 | 6.63E-09 | 339.3 | 22.7 | 1.46E+01 |
| 170-35 | 2 | 3 | 0.35 | 0 | -0.1 | 16.7 | 33.4 | 50.1 | 1.448302 | 2.64E-22 | 170.46 | 14.30 | 1.37E-07 | 1.446679 | 1.00E-16 | 257.5 | 18.5 | 7.46E-03 | 1.444726 | 4.12E-08 | 345.4 | 22.9 | 1.05E+02 |
| 170-36 | 3 | 4 | 0.25 | 0 | -0.5 | 15.3 | 45.9 | 61.2 | 1.446812 | 3.59E-20 | 168.28 | 14.42 | 8.00E-05 | 1.445204 | 4.55E-11 | 303.3 | 20.4 | 3.07E-02 | 1.443724 | 4.11E-01 | 1078.2 | 36.7 | 3.60E+00 |
| 170-37 | 3 | 4 | 0.25 | 0 | -0.4 | 15.3 | 45.9 | 61.2 | 1.446812 | 7.33E-20 | 168.28 | 14.42 | 2.24E-04 | 1.445204 | 1.21E-10 | 303.6 | 20.4 | 9.90E-02 | 1.443731 | 1.31E+00 | 1107.6 | 37.2 | 1.22E+01 |
| 170-38 | 3 | 4 | 0.25 | 0 | -0.3 | 15.3 | 45.9 | 61.2 | 1.446812 | 1.65E-19 | 168.28 | 14.42 | 7.16E-04 | 1.445204 | 3.58E-10 | 303.6 | 20.4 | 3.89E-01 | 1.443740 | 5.03E+00 | 1155.8 | 38.5 | 5.09E+01 |
| 170-39 | 3 | 4 | 0.25 | 0 | -0.2 | 15.3 | 45.9 | 61.2 | 1.446812 | 4.13E-19 | 168.28 | 14.42 | 2.80E-03 | 1.445204 | 1.25E-09 | 303.8 | 20.5 | 2.13E+00 | 1.443756 | 2.61E+01 | 1262.2 | 42.7 | 2.83E+02 |
| 170-40 | 3 | 4 | 0.25 | 0 | -0.1 | 15.3 | 45.9 | 61.2 | 1.446812 | 1.22E-18 | 168.28 | 14.42 | 1.55E-02 | 1.445204 | 5.68E-09 | 304.2 | 20.5 | 2.31E+01 | 1.443794 | 2.41E+02 | 1705.2 | 67.1 | 2.23E+03 |

FIG.32

| No. | Ra2 | Ra3 | Δ1 % | Δ2 % | Δ3 % | 2a μm | 2b μm | 2c μm | FUNDAMENTAL (LP01 MODE) ||||| HIGHER-ORDER (LP11 MODE) ||||| HIGHER-ORDER (LP21 MODE) |||||
|---|---|---|---|---|---|---|---|---|---|---|---|---|---|---|---|---|---|---|---|---|---|---|---|
| | | | | | | | | | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m | neff | LEAKAGE LOSS dB/m | Aeff μm² | MFD μm | BENDING LOSS dB/m |
| 170-41 | 3 | 5 | 0.25 | 0 | -0.5 | 15.2 | 45.6 | 76.0 | 1.446801 | 3.89E-21 | 166.91 | 14.37 | 3.03E-08 | 1.445181 | 7.97E-14 | 303.0 | 20.4 | 1.78E-05 | 1.443706 | 1.21E-04 | 1086.2 | 36.7 | 3.06E-03 |
| 170-42 | 3 | 5 | 0.25 | 0 | -0.4 | 15.2 | 45.6 | 76.0 | 1.446801 | 1.29E-20 | 166.91 | 14.37 | 2.37E-07 | 1.445181 | 5.99E-13 | 303.1 | 20.4 | 1.49E-04 | 1.443713 | 9.75E-04 | 1115.4 | 37.1 | 3.31E-02 |
| 170-43 | 3 | 5 | 0.25 | 0 | -0.3 | 15.2 | 45.6 | 76.0 | 1.446801 | 4.73E-20 | 166.92 | 14.37 | 2.34E-06 | 1.445182 | 5.25E-12 | 303.3 | 20.4 | 1.88E-03 | 1.443723 | 1.11E-02 | 1160.1 | 37.8 | 5.70E-01 |
| 170-44 | 3 | 5 | 0.25 | 0 | -0.2 | 15.2 | 45.6 | 76.0 | 1.446801 | 2.15E-19 | 166.92 | 14.37 | 3.39E-05 | 1.445182 | 6.02E-11 | 303.6 | 20.5 | 4.68E-02 | 1.443740 | 2.16E-01 | 1242.1 | 39.1 | 2.36E+01 |
| 170-45 | 3 | 5 | 0.25 | 0 | -0.1 | 15.2 | 45.6 | 76.0 | 1.446801 | 1.29E-18 | 166.92 | 14.37 | 1.01E-03 | 1.445182 | 1.12E-09 | 304.1 | 20.5 | 5.54E+00 | 1.443779 | 1.21E+01 | 1490.2 | 44.1 | 2.23E+03 |
| 170-46 | 3 | 4 | 0.30 | 0 | -0.5 | 16.0 | 48.0 | 64.0 | 1.447550 | 1.19E-21 | 167.70 | 14.27 | 5.90E-07 | 1.445913 | 4.18E-15 | 269.2 | 19.0 | 8.19E-04 | 1.444109 | 2.64E-02 | 565.5 | 29.1 | 1.29E+00 |
| 170-47 | 3 | 4 | 0.30 | 0 | -0.4 | 16.0 | 48.0 | 64.0 | 1.447550 | 2.79E-21 | 167.70 | 14.27 | 1.60E-06 | 1.445909 | 1.12E-14 | 269.7 | 19.1 | 2.58E-03 | 1.444110 | 8.55E-02 | 570.9 | 29.3 | 4.88E+00 |
| 170-48 | 3 | 4 | 0.30 | 0 | -0.3 | 16.0 | 48.0 | 64.0 | 1.447550 | 6.25E-21 | 167.70 | 14.27 | 4.8453E-06 | 1.445913 | 3.07E-14 | 269.2 | 19.0 | 9.70E-03 | 1.444112 | 3.32E-01 | 579.1 | 29.7 | 2.36E+01 |
| 170-49 | 3 | 4 | 0.30 | 0 | -0.2 | 16.0 | 48.0 | 64.0 | 1.447550 | 1.67E-20 | 167.70 | 14.27 | 1.72E-05 | 1.445913 | 9.93E-14 | 269.2 | 19.0 | 4.81E-02 | 1.444115 | 1.73E+00 | 594.7 | 30.7 | 1.67E+02 |
| 170-50 | 3 | 4 | 0.30 | 0 | -0.1 | 16.0 | 48.0 | 64.0 | 1.447550 | 1.37E-20 | 167.61 | 14.25 | 1.58E-05 | 1.445910 | 7.61E-14 | 267.1 | 18.9 | 3.64E-02 | 1.444047 | 1.72E+00 | 431.1 | 26.1 | 6.07E+02 |
| 170-51 | 3 | 5 | 0.30 | 0 | -0.5 | 16.0 | 48.0 | 80.0 | 1.447550 | 2.89E-23 | 167.70 | 14.27 | 2.23E-10 | 1.445913 | 5.75E-18 | 269.0 | 19.0 | 2.24E-07 | 1.444109 | 3.38E-06 | 565.5 | 29.1 | 6.84E-04 |
| 170-52 | 3 | 5 | 0.30 | 0 | -0.4 | 16.0 | 48.0 | 80.0 | 1.447550 | 1.14E-22 | 167.70 | 14.27 | 1.85E-09 | 1.445913 | 4.83E-17 | 269.0 | 19.0 | 1.89E-06 | 1.444110 | 2.79E-05 | 570.8 | 29.3 | 8.96E-03 |
| 170-53 | 3 | 5 | 0.30 | 0 | -0.3 | 16.0 | 48.0 | 80.0 | 1.447550 | 5.25E-22 | 167.70 | 14.27 | 1.86E-08 | 1.445913 | 4.37E-16 | 269.0 | 19.0 | 2.31E-05 | 1.444112 | 3.29E-04 | 578.7 | 29.5 | 2.01E+01 |
| 170-54 | 3 | 5 | 0.30 | 0 | -0.2 | 16.0 | 48.0 | 80.0 | 1.447550 | 2.18E-21 | 167.70 | 14.27 | 2.54E-07 | 1.445913 | 4.72E-15 | 269.0 | 19.0 | 5.01E-04 | 1.444115 | 6.60E-03 | 592.6 | 30.0 | 1.30E+01 |
| 170-55 | 3 | 5 | 0.30 | 0 | -0.1 | 16.0 | 48.0 | 80.0 | 1.447550 | 1.76E-20 | 167.70 | 14.27 | 6.07E-06 | 1.445913 | 7.22E-14 | 269.1 | 19.0 | 3.62E-02 | 1.444121 | 3.92E-01 | 627.2 | 31.3 | 1.85E+03 |
| 170-56 | 3 | 4 | 0.25 | 0 | -0.5 | 15.2 | 45.6 | 76.0 | 1.446801 | 7.23E-20 | 166.92 | 14.37 | 2.66E-06 | 1.445182 | 6.14E-11 | 305.1 | 20.6 | 1.01E+00 | 1.443912 | 2.55E-01 | 2265.2 | 52.9 | 5.63E+00 |
| 170-57 | 4 | 5 | 0.25 | 0 | -0.4 | 15.2 | 45.6 | 60.8 | 1.446801 | 1.53E-19 | 166.92 | 14.37 | 7.96E-05 | 1.445182 | 1.63E-10 | 305.1 | 20.6 | 3.25E+00 | 1.443917 | 8.06E+00 | 2302.7 | 53.4 | 1.89E+01 |
| 170-58 | 4 | 5 | 0.25 | 0 | -0.3 | 15.2 | 45.6 | 60.8 | 1.446801 | 3.57E-19 | 166.92 | 14.37 | 2.79E-04 | 1.445182 | 4.85E-10 | 305.1 | 20.6 | 1.26E+01 | 1.443924 | 3.07E+00 | 2362.5 | 54.4 | 7.70E+01 |
| 170-59 | 4 | 5 | 0.25 | 0 | -0.2 | 15.2 | 45.6 | 60.8 | 1.446801 | 9.29E-19 | 166.92 | 14.37 | 1.26E-03 | 1.445182 | 1.70E-09 | 305.2 | 20.6 | 6.52E+01 | 1.443936 | 1.58E+01 | 2486.2 | 57.2 | 4.03E+02 |
| 170-60 | 4 | 5 | 0.25 | 0 | -0.1 | 15.2 | 45.6 | 60.8 | 1.446801 | 2.81E-18 | 166.92 | 14.37 | 9.20E-03 | 1.445182 | 7.78E-09 | 305.2 | 20.6 | 1.93E+02 | 1.443964 | 1.48E+02 | 2652.9 | 76.7 | 4.36E+03 |
| 170-61 | 4 | 5 | 0.30 | 0 | -0.5 | 16.0 | 64.0 | 80.0 | 1.447550 | 5.43E-22 | 167.70 | 14.27 | 1.59E-07 | 1.445913 | 4.11E-15 | 268.8 | 19.1 | 2.86E-03 | 1.444146 | 1.64E-02 | 824.3 | 36.8 | 2.83E+00 |
| 170-62 | 4 | 5 | 0.30 | 0 | -0.4 | 16.0 | 64.0 | 80.0 | 1.447550 | 1.06E-21 | 167.70 | 14.27 | 4.66E-07 | 1.445913 | 1.05E-14 | 268.8 | 19.1 | 1.27E-02 | 1.444147 | 5.43E-02 | 833.9 | 37.1 | 9.93E+00 |
| 170-63 | 4 | 5 | 0.30 | 0 | -0.3 | 16.0 | 64.0 | 80.0 | 1.447550 | 2.27E-21 | 167.70 | 14.27 | 1.57E-06 | 1.445909 | 3.18E-14 | 269.3 | 19.1 | 8.98E-02 | 1.444148 | 2.18E-01 | 848.6 | 37.5 | 4.25E+01 |
| 170-64 | 4 | 5 | 0.30 | 0 | -0.2 | 16.0 | 64.0 | 80.0 | 1.447550 | 6.36E-21 | 167.70 | 14.27 | 6.53E-06 | 1.445913 | 9.91E-14 | 268.8 | 19.1 | 2.72E+00 | 1.444150 | 1.20E+00 | 876.1 | 38.5 | 2.44E+02 |
| 170-65 | 4 | 5 | 0.30 | 0 | -0.1 | 16.0 | 64.0 | 80.0 | 1.447550 | 1.81E-20 | 167.70 | 14.27 | 3.9243E-05 | 1.445913 | 3.91E-13 | 268.8 | 19.1 | 3.73E+00 | 1.444154 | 1.30E+01 | 964.1 | 43.8 | 1.99E+03 |

OPTICAL FIBER AND OPTICAL TRANSMISSION SYSTEM

CROSS-REFERENCE TO RELATED APPLICATION

This application is a continuation of PCT International Application No. PCT/JP2012/052865 filed on Feb. 8, 2012 which claims the benefit of priority from Japanese Patent Application No. 2011-026176 filed on Feb. 9, 2011 and No. 2011-215488 filed on Sep. 29, 2011, the entire contents of which are incorporated herein by reference.

BACKGROUND OF THE INVENTION

1. Field of the Invention

The present invention relates to an optical fiber and an optical transmission system.

2. Description of the Related Art

With the recent dramatic increase in the Internet traffic, it is expected that transmission capacity will be insufficient in the future. As methods for solving this, mode-division-multiplexing transmission techniques are disclosed in which higher-order propagation modes are used for optical transmission in addition to a fundamental propagation mode of the optical fiber that has been conventionally used (refer to C. Koebele, M. Salsi, G. Charlet, S. Bigo "Nonlinear Effects in Long-Haul Transmission over Bimodal Optical Fiber," ECOC2010, Mo.2.C.6. and Bernd Franz, Detlef Suikat, Roman Dischler, Fred Buchali, Henning Buelow "High Speed OFDM Data Transmission Over 5 km GI-Multimode Fiber Using Spatial Multiplexing With 2×4 MIMO Processing," ECOC2010, Tu.3.C.4.). For higher quality optical transmission, it is also important to enlarge an effective core area (Aeff) of the optical fiber so as to suppress the occurrence of a nonlinear optical phenomenon in the optical fiber (refer to Marianne Bigot-Astruc, Frans Gooijer, Nelly Montaigne, Pierre Sillard, "Trench-Assisted Profiles for Large-Effective-Area Single-Mode Fibers," ECOC2008, Mo.4.B.1. and Yoshinori Yamamoto, Masaaki Hirano, Kazuya Kuwahara, Takashi Sasaki "OSNR-Enhancing Pure-Silica-Core Fiber with Large Effective Area and low Attenuation," OFC/NFOEC2010, OTuI2.). In Marianne Bigot-Astruc, et al., "125 μm glass diameter single-mode fiber with Aeff of 155 μm2" OFC/NFOEC2011, OTuJ2 (2011), an optical fiber is proposed in which Aeff is enlarged to 155 $\mu m^2$ by optimizing a refractive index profile using a trench structure.

SUMMARY OF THE INVENTION

It is an object of the present invention to at least partially solve the problems in the conventional technology.

In accordance with one aspect of the present invention, an optical fiber includes a core portion and a cladding portion that is formed on an outer periphery of the core portion and has a refractive index lower than a maximum refractive index of the core portion. Characteristics at a wavelength of 1550 nm are an effective core area of a fundamental propagation mode of equal to or larger than 120 $\mu m^2$, an effective core area of a first higher-order propagation mode of equal to or larger than 170 $\mu m^2$, and an effective refractive index of the first higher-order propagation mode of larger than a refractive index of the cladding portion by equal to or larger than 0.0005.

In accordance with another aspect of the present invention, an optical transmission system includes an optical fiber which includes a core portion and a cladding portion that is formed on an outer periphery of the core portion and has a refractive index lower than a maximum refractive index of the core portion. Characteristics at a wavelength of 1550 nm are an effective core area of a fundamental propagation mode of equal to or larger than 120 $\mu m^2$, an effective core area of a first higher-order propagation mode of equal to or larger than 170 $\mu m^2$, and an effective refractive index of the first higher-order propagation mode of larger than a refractive index of the cladding portion by equal to or larger than 0.0005.

The above and other objects, features, advantages and technical and industrial significance of this invention will be better understood by reading the following detailed description of presently preferred embodiment of the invention, when considered in connection with the accompanying drawings.

BRIEF DESCRIPTION OF THE DRAWINGS

FIG. 5 is a schematic diagram illustrating structural parameters and optical characteristics when the effective core area of the LP01 mode is set to around 130 $\mu m^2$;

FIG. 6 is a schematic diagram illustrating the structural parameters and the optical characteristics when the effective core area of the LP01 mode is set to around 150 $\mu m^2$;

FIG. 7 is a schematic diagram illustrating the structural parameters and the optical characteristics when the effective core area of the LP01 mode is set to around 170 $\mu m^2$;

FIG. 8 is a schematic diagram illustrating the structural parameters and the optical characteristics when the effective core area of the LP01 mode is set to around 130 $\mu m^2$ and a value of Δ2 is changed;

FIG. 9 is a schematic diagram illustrating the structural parameters and the optical characteristics when the effective core area of the LP01 mode is set to around 150 $\mu m^2$ and the value of Δ2 is changed;

FIG. 10 is a schematic diagram illustrating the structural parameters and the optical characteristics when the effective core area of the LP01 mode is set to around 170 $\mu m^2$ and the value of Δ2 is changed;

FIG. 28 is a schematic diagram illustrating the structural parameters and the optical characteristics when the effective core area of the LP01 mode is set to around 130 μm²;

FIG. 29 is a schematic diagram illustrating the structural parameters and the optical characteristics when the effective core area of the LP01 mode is set to around 150 μm²;

FIGS. 30 to 32 are a schematic diagram illustrating the structural parameters and the optical characteristics when the effective core area of the LP01 mode is set to around 170 μm²;

DETAILED DESCRIPTION OF THE PREFERRED EMBODIMENT

Figure 1:
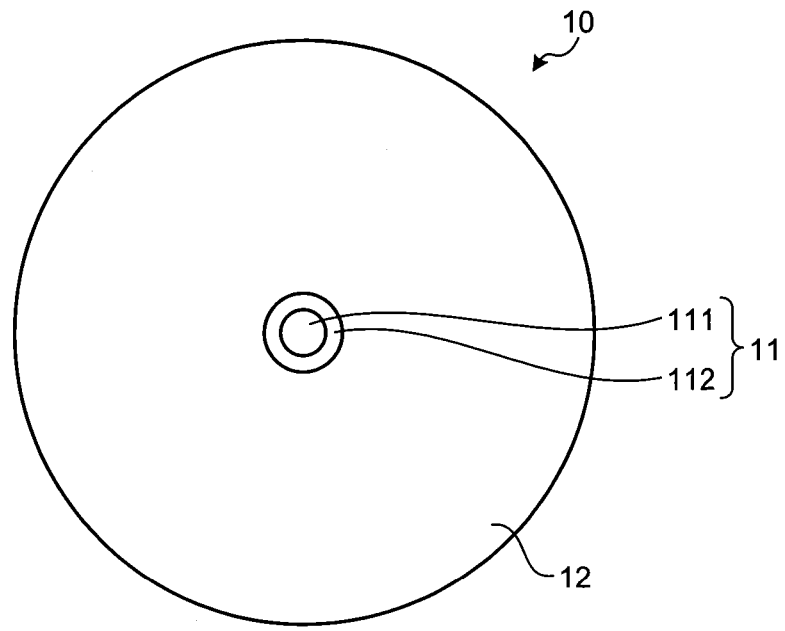
FIG. 1 is a schematic cross sectional view of an optical fiber according to a first embodiment.

Embodiments of an optical fiber and an optical transmission system according to the invention will be explained below in detail referring to the drawings. The embodiments do not limit the present invention. A bending loss means a macro-bending loss when an optical fiber is bent at a diameter of 20 mm. Any terms not specifically defined in the present description follow definitions and measuring methods of the ITU-T (International Telecommunication Union Standardization sector) G. 650.1.

The enlargement of the effective core area of the optical fiber, however, has a problem in that it increases bending loss. Particularly, when the fundamental and the high-order propagation modes of the optical fiber are used for optical transmission, the problem of bending loss arises for each propagation mode.

In contrast, according to the embodiments described below, the optical fiber is achievable that has a large effective core area and a small bending loss in each propagation mode to be used.

FIG. 1 is a schematic cross sectional view of an optical fiber according to a first embodiment of the present invention. As illustrated in FIG. 1, an optical fiber 10 includes a core portion 11 located at the center thereof and a cladding portion 12 formed on the outer periphery of the core portion 11.

The core portion 11 consists of a center core portion 111 and an outer core portion 112 formed on the outer periphery of the center core portion 111. The center core portion 111 is made of silica glass containing dopant such as germanium (Ge), which increases a refractive index thereof. The outer core portion 112 is made of silica glass containing dopant such as fluorine (F), which decreases a refractive index thereof. The cladding portion 12 is made of pure silica glass containing no dopant for adjusting a refractive index thereof. As a result, the center core portion 111 has a refractive index that is maximum in the core portion 11 and higher than that of the cladding portion 12. The outer core portion 112 has a refractive index lower than that of the cladding portion 12.

Figure 2:
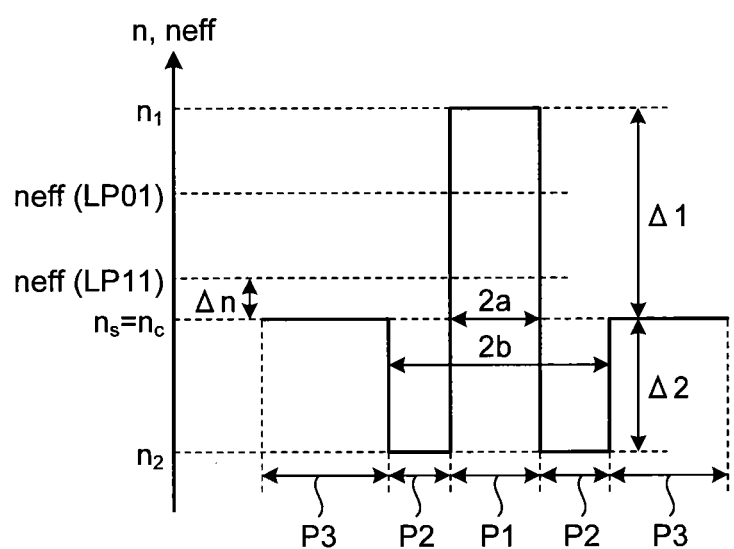
FIG. 2 is a schematic diagram illustrating a refractive index profile of the optical fiber illustrated in FIG. 1.

FIG. 2 is a schematic diagram illustrating a refractive index profile of the optical fiber 10 illustrated in FIG. 1. In FIG. 2, a region P1 illustrates the refractive index profile of the center core portion 111. A region P2 illustrates the refractive index profile of the outer core portion 112. A region P3 illustrates the refractive index profile of the cladding portion 12. In this way, the optical fiber 10 has what is called a W-shaped refractive index profile, in which the refractive index of the outer core portion 112 is lower than that of the cladding portion 12.

As illustrated in FIG. 2, a relative refractive-index difference of the center core portion 111 with respect to the cladding portion 12 is denoted by Δ1, while a relative refractive-index difference of the outer core portion 112 with respect to the cladding portion 12 is denoted by Δ2. The relative refractive-index differences Δ1 and Δ2 are defined by the following formulas (1) and (2).

$$\Delta 1 = \{(n_1 - n_c)/n_c\} \times 100 [\%] \tag{1}$$

$$\Delta 2 = \{(n_2 - n_c)/n_c\} \times 100 [\%] \tag{2}$$

where $n_1$ is the maximum refractive index of the center core portion 111, $n_2$ is the refractive index of the outer core portion 112, and $n_c$ is the refractive index of the cladding portion 12. In the first embodiment, the cladding portion 12 is made of pure silica glass. Thus, $n_c$ is equal to a refractive index $n_s$ of silica glass (which is 1.44439 at a wavelength of 1550 nm).

As illustrated in FIG. 2, a diameter of the center core portion 111 is denoted by 2a while the outer diameter of the outer core portion 112 is denoted by 2b. A ratio b/a of the outer diameter 2b of the outer core portion to the diameter 2a of the center core portion is denoted by Ra2. The diameter 2a of the center core portion is defined as a diameter at which the relative refractive-index difference Δ1 becomes 0% at a border between the center core portion 111 and the outer core portion 112. The outer diameter 2b of the outer core portion is defined as a diameter at which the relative refractive-index difference becomes half of the relative refractive-index difference Δ2 at a border between the outer core portion 112 and the cladding portion 12.

As illustrated in FIG. 2, the effective refractive index of an LP01 mode, which is a fundamental propagation mode of the optical fiber 10 according to the first embodiment, is denoted by $n_{\mathit{eff}}$(LP01), while the effective refractive index of an LP11 mode, which is a first higher-order propagation mode of the optical fiber 10 according to the first embodiment, is denoted by $n_{\mathit{eff}}$(LP11). In the optical fiber 10, when a difference between $n_{\mathit{eff}}$(LP11) and the refractive index $n_c$ of the cladding portion 12 is denoted by Δn, Δn is equal to or larger than 0.0005.

As described above, in the optical fiber 10, the effective refractive index $n_{\it eff}$ (LP11) of the LP11 mode, which is the first higher-order propagation mode, is larger than the refractive index $n_c$ of the cladding portion 12 by equal to or larger than 0.0005. As a result, the optical fiber 10 has the following characteristics at a wavelength of 1550 nm: an effective core area of the LP01 mode is equal to or larger than 1201.1 m², an effective core area of the LP11 mode is equal to or larger than 170 μm² and furthermore equal to or larger than 180 μm², and a bending loss is small in both of the LP01 and LP11 modes.

To achieve $n_{\it eff}$(LP11) that is larger than $n_c$ by equal to or larger than 0.0005, the following exemplary settings are made: Δ1 is 0.37%, Δ2 is −0.10%, and 2a and 2b are 16.10 μm and 32.20 μm, respectively, (i.e., Ra2 is 2.0). When structural parameters of the optical fiber 10 are set in this way, neff (LP11) is 1.44660, which is larger than nc by equal to or larger than 0.0005. Meanwhile, desired characteristics at a wavelength of 1550 nm are obtained as follows: for the LP01 mode, the effective core area is 150.1 μm2 and the bending loss is 3.14×10−8 dB/m, and for the LP11 mode, the effective core area is 219.6 μm2 and the bending loss is 2.42×10-2 dB/m.

When the structural parameters of the optical fiber 10 are set as described above, an effective refractive index $n_{\it eff}$ (LP21) of LP21, which is a second high-order propagation mode, at a wavelength of 1550 nm is 1.44431, which is smaller than the refractive index of silica glass (1.44439). As a result, in the optical fiber 10, at a wavelength of 1550 nm, the LP21 mode becomes a leaky mode, and only the two modes, namely the LP01 mode and the LP11 mode become propagation modes.

Figure 3A:
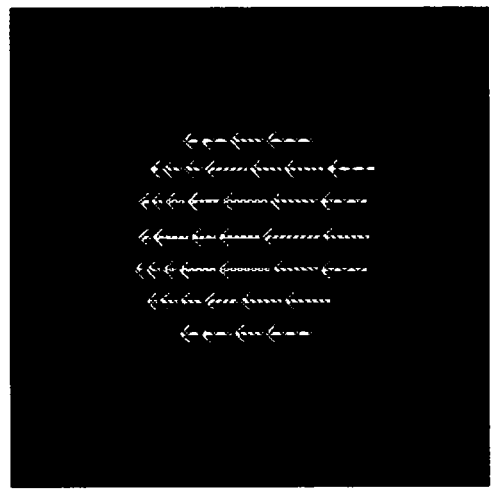
FIGS. 3A and 3B are schematic diagrams illustrating a field profile of a fundamental mode (LP01 mode) of the optical fiber illustrated in FIG. 1.
Figure 3B:
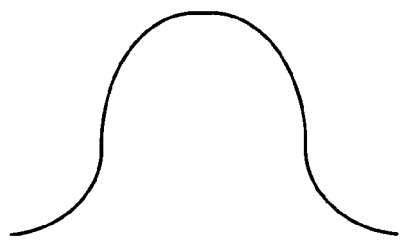
Figure 4A:
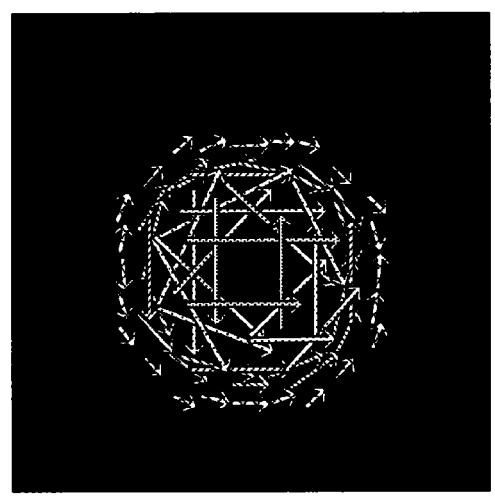
FIGS. 4A and 4B are schematic diagrams illustrating a field profile of a first higher-order propagation mode (LP11 mode) of the optical fiber illustrated in FIG. 1.
Figure 4B:
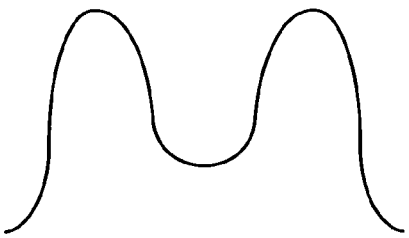

In such a case where only the two modes of LP01 mode and LP11 mode are propagation modes, interference between the two propagation modes is little and it is thus more preferable. FIGS. 3A, 3B, 4A and 4B are schematic diagrams illustrating field profiles of the LP01 and LP11 modes of the optical fiber 10 structural parameters of which are set as described above. FIGS. 3(A) and 4(A) illustrate fields of the respective propagation modes. The direction and magnitude of the arrow indicate the direction and the magnitude of the field, respectively. FIGS. 3(B) and 4(B) illustrate the field profiles (intensity profiles) of the respective propagation modes.

As illustrated in FIGS. 3A and 3B, the LP01 mode is a Gaussian shape having the field at the center. On the other hand, as illustrated in FIGS. 4A and 4B, the LP11 mode is a doughnut shape having no field profile at the center. As a result, the interference between the fields of the respective propagation modes is suppressed. Therefore, in the case that two signal lights are input to the optical fiber 10, if the two signals are input and propagated such that the signals are propagated in the respective propagation modes, two-mode optical transmission having little interference there between is possible. A calculation is performed by applying a parameter C12 (a coupling constant of an abutting coupling) of a directional coupler described in Katsunari Okamoto "Theory of Optical Waveguides", Corona Publishing Co., Ltd., Oct. 20, 1992, to the two propagation modes of the optical fiber 10. As a result, C12 is a very small value in the order of $10^{-9}$ to $10^{-10}$. Thus it is thought that the interference between the two modes hardly exists. In contrast, when the LP21 mode is the propagation mode besides the LP01 and LP11 modes, the LP21 mode may interfere with the LP11 mode because the LP21 mode is a ring shape having the field at the center.

As described above, the optical fiber 10 according to the first embodiment has a large effective core area and a small bending loss in both of the LP01 and LP11 modes used therein, and very little interference between the respective propagation modes.

A preferable design of the optical fiber according to the first embodiment is described more specifically with reference to calculation results using simulations employing a finite element method.

FIG. 5 is a schematic diagram illustrating the structural parameters and optical characteristics when the effective core area of the LP01 mode is set to around 130 μm². In FIG. 5, "dispersion" means a wavelength dispersion, "slope" means a dispersion slope, "MFD" means a mode field diameter, "$n_{\it eff}$" means the effective refractive index, "Δn" means the difference between $n_{\it eff}$ of the LP11 mode and the refractive index $n_c$ of the cladding portion, "Aeff" means the effective core area, and "leakage loss" means a transmission loss (leakage loss) of the LP21 mode due to leakage of light. In addition, "E" is a symbol representing exponentiation of 10 in a value of the bending loss. For example, "2.3E-0.6" means "2.3×10⁶". The optical characteristics indicate the values thereof at a wavelength of 1550 nm.

FIG. 6 is a schematic diagram illustrating the structural parameters and the optical characteristics when the effective core area of the LP01 mode is set to around 150 μm². FIG. 7 is a schematic diagram illustrating the structural parameters and the optical characteristics when the effective core area of the LP01 mode is set to around 170 μm². FIG. 8 is a schematic diagram illustrating the structural parameters and the optical characteristics when the effective core area of the LP01 mode is set to around 130 μm² and the value of Δ2 is changed. FIG. 9 is a schematic diagram illustrating the structural parameters and the optical characteristics when the effective core area of the LP01 mode is set to around 150 μm² and the value of Δ2 is changed. FIG. 10 is a schematic diagram illustrating the structural parameters and the optical characteristics when the effective core area of the LP01 mode is set to around 170 μm² and the value of Δ2 is changed.

As illustrated in FIGS. 5 to 10, when the relative refractive-index difference Δ1 is equal to or larger than 0.22%, the relative refractive-index difference Δ2 is smaller than 0%, the diameter 2a of the center core portion is 14.10 μm to 18.30 μm, and the ratio Ra2 is equal to or larger than 2.0, the optical fiber is achievable that has the effective core area of the LP01 mode of equal to or larger than 120 μm², the effective core area of the LP11 mode of equal to or larger than 170 μm², and small bending losses in the respective propagation modes. As for the bending loss, it is more preferable to select the combination of the structural parameters that achieves the bending loss of equal to or smaller than 1 dB/m in the LP01 mode and/or the bending loss of equal to or smaller than 10 dB/m in the LP11 mode.

For example, as can be seen from FIG. 7, when Δ1 is equal to or larger than 0.22%, $n_{\it eff}$ of the LP11 mode is about 1.44500. In this case, $n_{\it eff}$ of the LP11 mode is larger than $n_c$ (=1.44439), which is the refractive index of the cladding portion, by equal to or larger than 0.0005. The bending losses in this case are small: $1.21 \times 10^{-3}$ dB/m in the LP01 mode and $5.68 \times 10^{1}$ dB/m in the LP11 mode. It is preferable to further increase $n_{\it eff}$ of the LP11 mode, i.e., $n_{\it eff}$ of the LP11 mode is preferably larger than n, by equal to or larger than 0.0010 (i.e., $n_{\it eff}$(LP11)=1.44539 or more), more preferably, by equal to or larger than 0.0016 (i.e., $n_{\it eff}$(LP11)=1.44599 or more). When Δ1 is equal to or larger than 0.30%, $n_{\it eff}$ described above is achievable, for example. From the viewpoint of achieving sufficient light confinement, it is preferable that at least Δ1 is equal to or larger than 0.22% so as to increase $n_{\it eff}$ of the LP11 mode as described above.

On the other hand, the setting of Δ1 to be equal to or smaller than 0.42% makes it possible that $n_{eff}$ of the LP21 mode is smaller than the refractive index of silica glass (which is 1.44439 at 1550 nm). The setting of Δ1 to be equal to or smaller than 0.42% makes it possible to achieve optical transmission in the two modes LP01 and LP11.

Value ranges of the preferable structural parameters of the optical fiber according to the first embodiment are not limited to those described above. Changes in characteristics of the optical fiber when a specific structural parameter is changed are described more specifically below.

Figure 11:
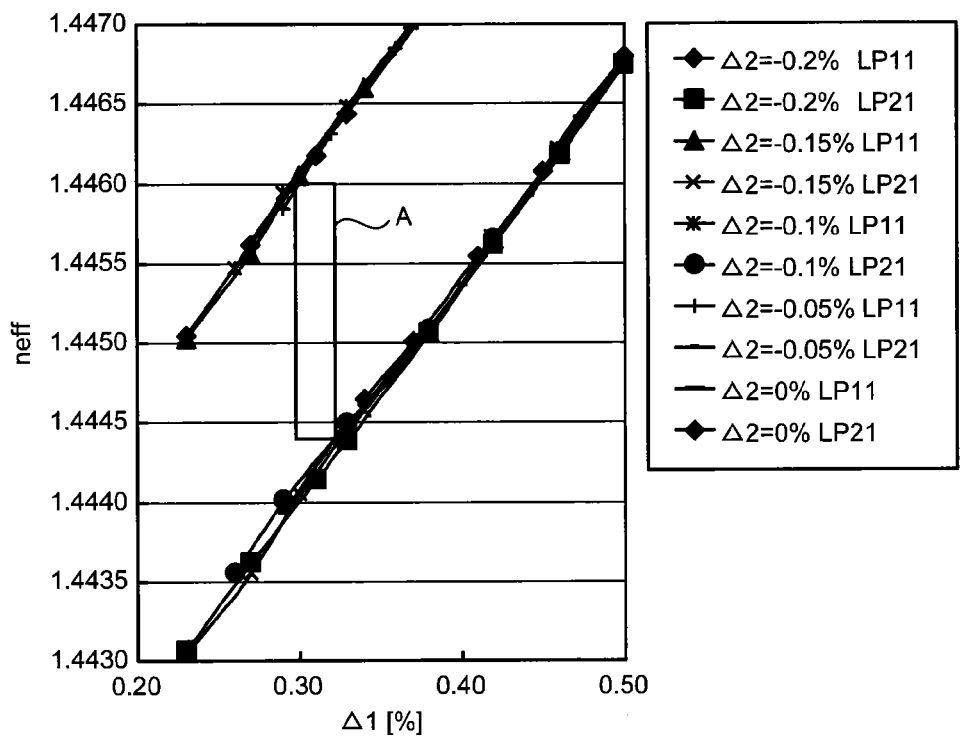
FIG. 11 is a schematic diagram illustrating a relation between a relative refractive-index difference Δ1 and an effective refractive index $n_{eff}$.

FIG. 11 is a schematic diagram illustrating a relation between the relative refractive-index difference Δ1 and the effective refractive index $n_{eff}$ at a wavelength of 1550 nm when the relative refractive-index difference Δ2 is changed in the optical fiber 10 having the structure illustrated in FIG. 1. The effective refractive indices $n_{eff}$ are illustrated for the respective LP11 and LP21 modes. The value of Ra is fixed to 3.0. The diameter 2a of the center core portion is adjusted such that the effective core area Aeff of the LP01 mode is 170 $\mu m^2$.

As a region A illustrated in FIG. 11, a range of Δ1 is present in which $n_{eff}$ of the LP21 mode is equal to or smaller than 1.44439 (the refractive index of silica glass) and $n_{eff}$ of the LP11 mode is equal to or larger than 1.4460. In this range, optical transmission in two modes is possible because the LP21 mode becomes the leaky mode. In addition, it can be seen that the range of the region A does not much depend on Δ2. In FIG. 11, it can be seen that the values of $n_{eff}$ are preferable when the values of Δ1 are around 0.3%. The calculations are performed on the combinations of all of the profile parameters (structural parameters). As a result, it is found that the combinations of the profile parameters enabling the transmission in two modes to be achieved are present when Δ1 is 0.20% to 0.50%.

Figure 12:
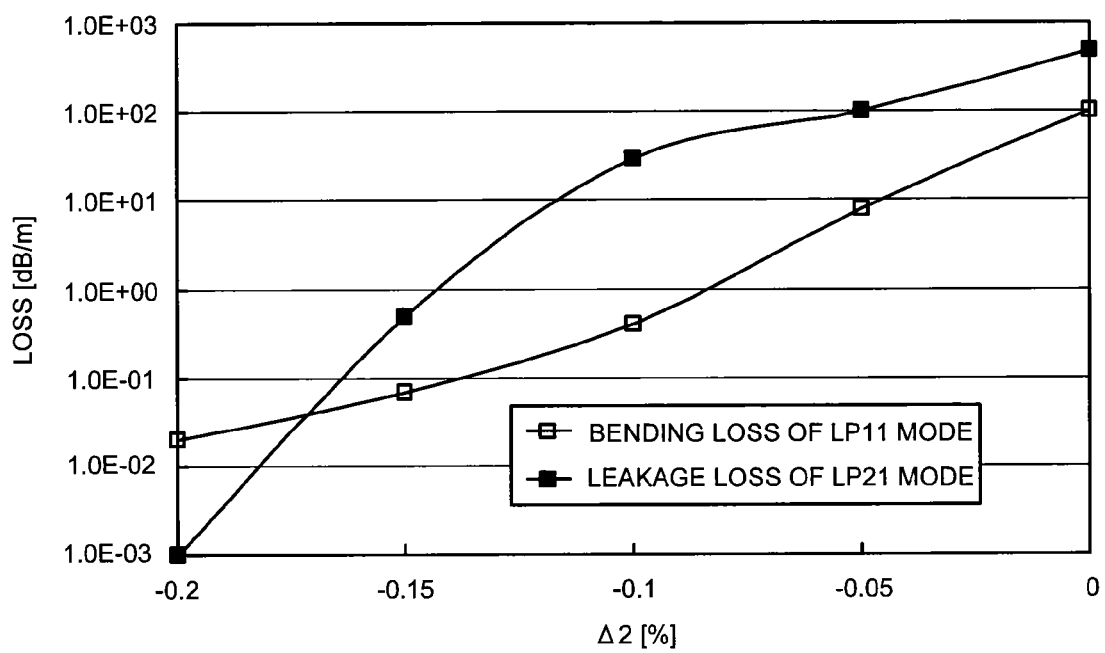
FIG. 12 is a schematic diagram illustrating a relation between a relative refractive-index difference Δ2 and a bending loss or a leakage loss.

FIG. 12 is a schematic diagram illustrating a relation between the relative refractive-index difference Δ2 and the bending loss or the leakage loss. In FIG. 12, Δ1 is fixed to 0.30% and Ra is fixed to 3.0. The diameter 2a of the center core portion is adjusted such that the effective core area Aeff of the LP01 mode is 170 $\mu m^2$.

As illustrated in FIG. 12, with an increase in Δ2, the bending loss of the LP11 increases. The case of FIG. 12 when Δ2 is smaller than −0.02% is preferable because the bending loss of the LP11 mode is equal to or smaller than 50 dB/m. In addition, the case in which Δ2 is smaller than −0.05% is more preferable because the bending loss of the LP11 mode is equal to or smaller than 10 dB/m. The calculations are performed on the combinations of all of the profile parameters. As a result, it is found that the combinations of the profile parameters are present by which the bending loss of the LP11 mode is achieved to be equal to or smaller than 50 dB/m when Δ2 is smaller than 0%.

On the other hand, when 42 is decreased, the LP21 mode may allow propagation because the leakage loss of the LP21 mode is decreased. The case of FIG. 12 when Δ2 is equal to or larger than −0.14% is preferable because the leakage loss of the LP21 mode is equal to or larger than 1 dB/m. The case in which Δ2 is equal to or larger than −0.12% is more preferable because the leakage loss is equal to or larger than 10 dB/m. The calculations are performed on the combinations of all of the profile parameters. As a result, it is found that the combinations of the profile parameters are present by which the leakage loss of the LP21 mode is achieved to be equal to or larger than 1 dB/m, which is preferable, when Δ2 is equal to or larger than −0.50%.

Figure 13:
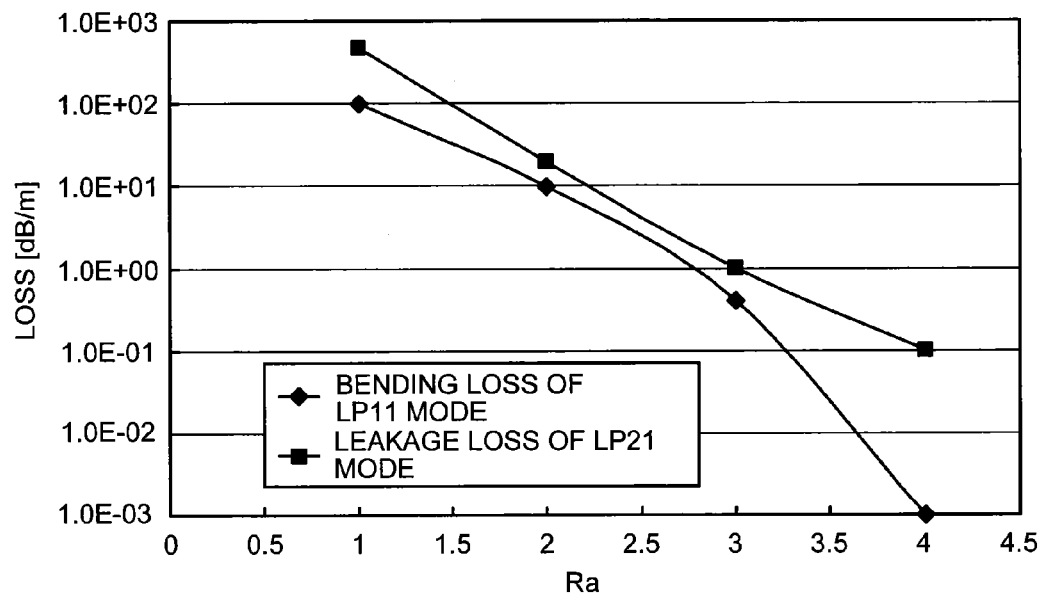
FIG. 13 is a schematic diagram illustrating a relation between Ra and the bending loss or the leakage loss.

FIG. 13 is a schematic diagram illustrating a relation between Ra and the bending loss or the leakage loss. In FIG. 13, Δ1 is fixed to 0.30% and Δ2 is fixed to −0.100. The diameter 2a of the center core portion is adjusted such that the effective core area Aeff of the LP01 mode is 170 $\mu m^2$.

As illustrated in FIG. 13, with a decrease in Ra, the bending loss of the LP11 mode increases. The case of FIG. 13 when Ra is larger than 1.2 is preferable because the bending loss of the LP11 mode is equal to or smaller than 50 dB/m. In addition, the case in which Ra is equal to or larger than 2.0 is more preferable because the bending loss of the LP11 mode is equal to or smaller than 10 dB/m. The calculations are performed on the combinations of all of the profile parameters. As a result, it is found that the combinations of the profile parameters are present by which the bending loss of the LP11 mode is achieved to be equal to or smaller than 50 dB/m when Ra is larger than 1.0.

On the other hand, when Ra is increased, the LP21 mode may allow propagation because the leakage loss of the LP21 mode is decreased. The case of FIG. 13 when Ra is equal to or smaller than 3.0 is preferable because the leakage loss of the LP21 mode is equal to or larger than 1 dB/m. The case in which Ra is equal to or smaller than 2.2 is more preferable because the leakage loss is equal to or larger than 10 dB/m. The calculations are performed on the combinations of all of the profile parameters. As a result, it is found that the combinations of the profile parameters are present by which the leakage loss of the LP21 mode is achieved to be equal to or larger than 1 dB/m when Ra is equal to or smaller than 4.0.

In FIGS. 11 to 13, the diameter 2a of the center core portion is adjusted such that the effective core area Aeff of the LP01 mode is 170 $\mu m^2$. The diameter 2a of the center core portion adjusted to be 15.00 $\mu m$ to 19.00 $\mu m$ enables Aeff to be equal to or larger than 170 $\mu m^2$. It is preferable that the outer diameter 2b of the outer core portion is larger than 15.00 $\mu m$ because it enables the bending loss of the LP11 mode to be equal to or smaller than 50 dB/m. It is preferable that the outer diameter 2b of the outer core portion is equal to or smaller than 76.00 $\mu m$ because it enables the leakage loss of the LP21 mode to be equal to or larger than 1 dB/m. When the diameter 2a of the center core portion is equal to or larger than 14.00 this enables the effective core area Aeff of the LP01 mode to be 120 $\mu m^2$.

Aeff is preferably equal to or larger than 120 $\mu m^2$, more preferably equal to or larger than 130 $\mu m^2$, under which conditions nonlinearity is low. It is preferable that Aeff is equal to or smaller than 170 $\mu m^2$ because a microbending loss becomes small and connectivity with the other optical fiber also becomes good.

As described above, it is found that the optical fiber having good characteristics from the viewpoints of Aeff, the bending loss, and the leakage loss is achievable when Δ1 is 0.20% to 0.50%, Δ2 is equal to or larger than −0.500 and smaller than 0%, the diameter 2a of the center core portion is 14.00 $\mu m$ to 19.00 $\mu m$, and Ra is larger than 1.0 and equal to or smaller than 4.0.

A relation between the relative refractive-index difference Δ1 and the bending loss or the leakage loss at a wavelength of 1550 nm is described below in the case that the relative refractive-index difference Δ2 is changed when the diameter 2a of the center core portion is adjusted such that the effective core area Aeff of the LP01 mode is 170 $\mu m^2$, 150 $\mu m^2$, or 130 $\mu m^2$.

Figure 14:
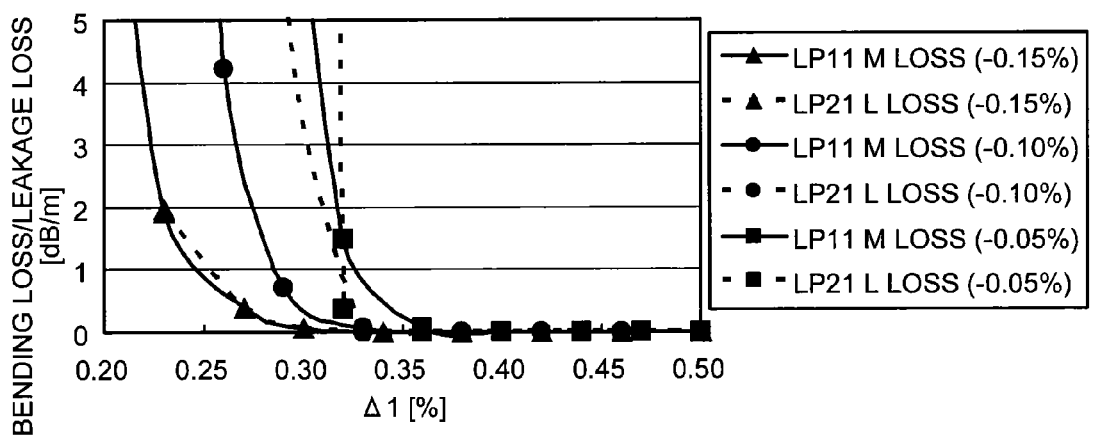
FIGS. 14 to 16 are a schematic diagram illustrating the relation between the relative refractive-index difference Δ1 and the bending loss or the leakage loss when the relative refractive index difference Δ2 is changed.

FIG. 14 is a schematic diagram illustrating the relation between the relative refractive-index difference Δ1 and the bending loss or the leakage loss when the relative refractive-index difference Δ2 is changed. In FIG. 14, Ra is fixed to 3.0.

The diameter 2a of the center core portion is adjusted such that the effective core area Aeff of the LP01 mode is 170 μm². In the explanatory note of FIG. 14, "LP11 M Loss (−0.15%)" indicates the bending loss (macro-bending loss) of the LP11 mode when Δ2 is −0.15%, and "LP21 L Loss (−0.15%)" indicates the leakage loss of the LP21 mode when Δ2 is −0.15%, for example.

As illustrated in FIG. 14, a range of Δ1 is present in which the bending loss of the LP11 mode is equal to or smaller than 5 dB/m and the leakage loss of the LP21 mode is equal to or larger than 1 dB/m in any of the cases where Δ2 is −0.05%, −0.10%, and −0.15%. In addition, the larger Δ2, the wider the range of Δ1.

Figure 15:
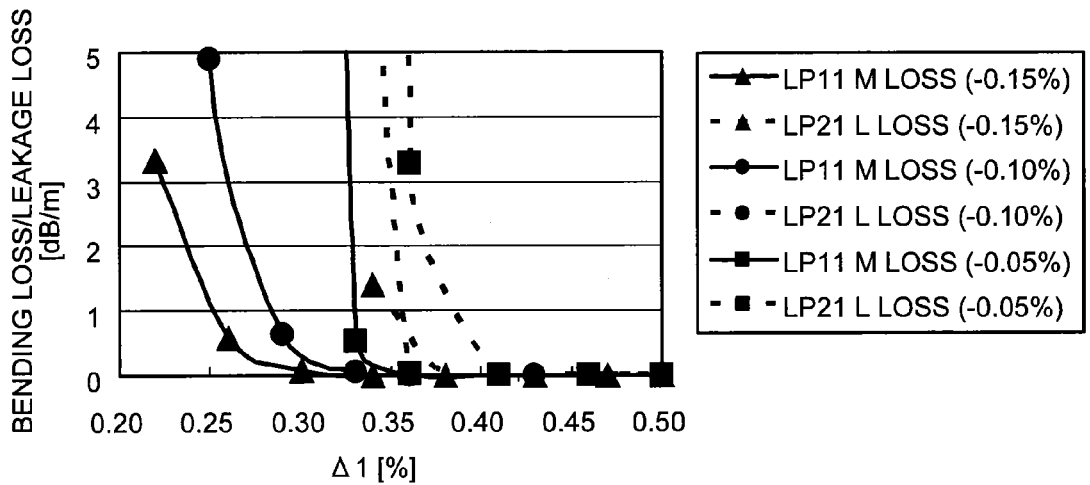

FIG. 15 is a schematic diagram illustrating the relation between the relative refractive-index difference Δ1 and the bending loss or the leakage loss when the relative refractive-index difference Δ2 is changed. In FIG. 15, Ra is fixed to 3.0. The diameter 2a of the center core portion is adjusted such that the effective core area Aeff of the LP01 mode is 150 μm². The explanatory note of FIG. 15 indicates the same meanings as FIG. 14.

As illustrated in FIG. 15, a range of Δ1 is present in which the bending loss of the LP11 mode is equal to or smaller than 5 dB/m and the leakage loss of the LP21 mode is equal to or larger than 1 dB/m in any of the cases where Δ2 is −0.05%, −0.10%, and −0.15%, also in the case that the effective core area Aeff of the LP01 mode is 150 μm². The larger A2, the wider the range of Δ1. In addition, the range of Δ1 is wider than in the case that the effective core area Aeff of the LP01 mode is 170 μm².

Figure 16:
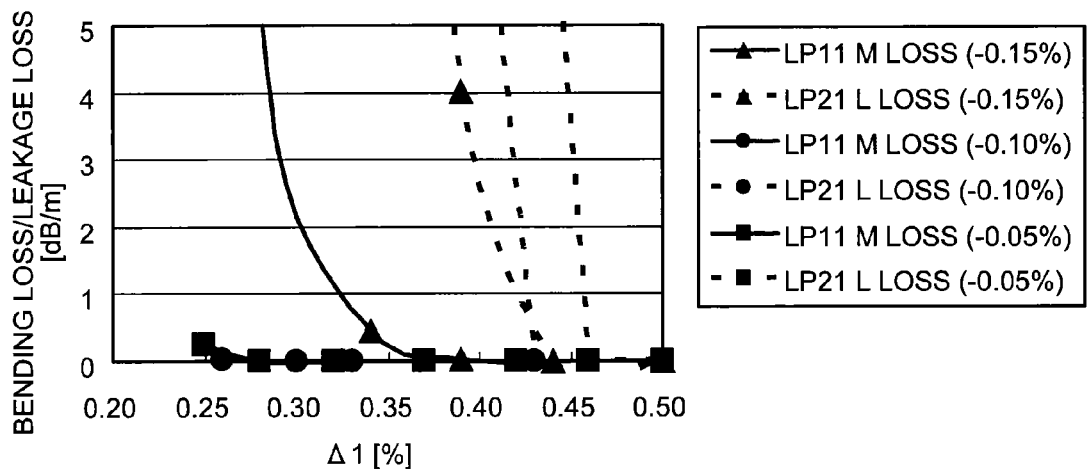

FIG. 16 is a schematic diagram illustrating the relation between the relative refractive-index difference Δ1 and the bending loss or the leakage loss when the relative refractive-index difference Δ2 is changed. In FIG. 16, Ra is fixed to 3.0. The diameter 2a of the center core portion is adjusted such that the effective core area Aeff of the LP01 mode is 130 μm². The explanatory note of FIG. 16 indicates the same meanings as FIG. 14.

As illustrated in FIG. 16, a range of Δ1 is present in which the bending loss of the LP11 mode is equal to or smaller than 5 dB/m and the leakage loss of the LP21 mode is equal to or larger than 1 dB/m in any of the cases where Δ2 is −0.05%, −0.10%, and −0.15%, also in the case that the effective core area Aeff of the LP01 mode is 130 μm². The larger A2, the wider the range of Δ1. In addition, the range of Δ1 is wider than in the case that the effective core area Aeff of the LP01 mode is 150 μm².

As indicated in the results of FIGS. 14 to 16, the smaller the effective core area Aeff of the LP01 mode, the wider the range of Δ1 achieving the preferable bending loss and leakage loss. Therefore, the ranges of the preferable structural parameters indicated on the basis of FIGS. 11 to 13, in which the effective core area Aeff of the LP01 mode is fixed to 170 μm², are also applicable to the case where the effective core area is smaller, e.g., 130 μm².

A relation between the relative refractive-index difference Δ1 and the bending loss or the leakage loss at a wavelength of 1550 nm when Ra is changed is described below.

Figures 17, 18:
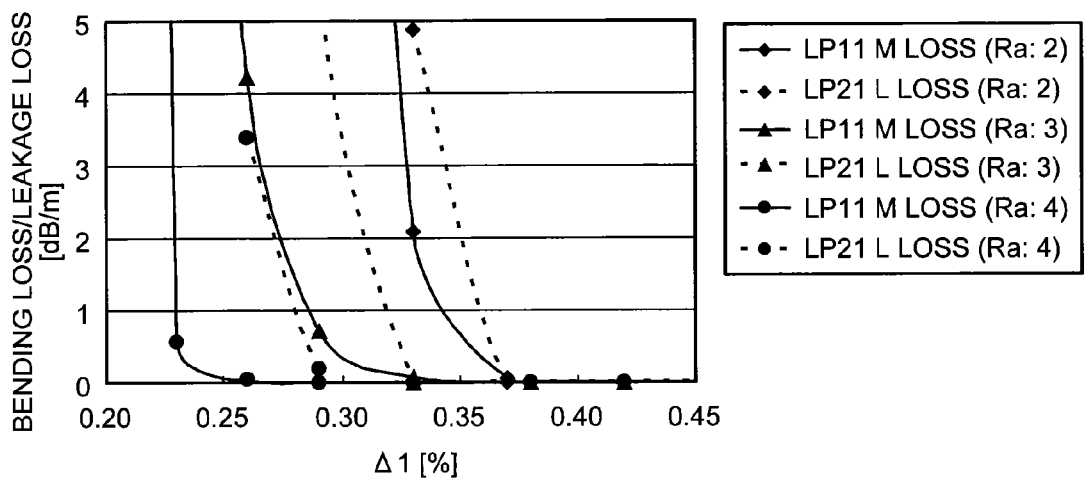
FIG. 17 is a schematic diagram illustrating the relation between the relative refractive-index difference Δ1 and the bending loss or the leakage loss when Ra is changed.
FIG. 18 is a schematic diagram illustrating calculation results of the optical characteristics of the optical fiber in the case that the relative refractive-index difference Δ1 is 0.33%, the relative refractive-index difference Δ2 is −0.1%, and a diameter 2a of the center core portion is 17.2 μm when Ra illustrated in FIG. 17 is 2.0.

FIG. 17 is a schematic diagram illustrating the relation between the relative refractive-index difference Δ1 and the bending loss or the leakage loss when Ra is changed. In FIG. 17, the relative refractive-index difference Δ2 is fixed to −0.10%. The diameter 2a of the center core portion is adjusted such that the effective core area Aeff of the LP01 mode is 170 μm². In the explanatory note of FIG. 17, "LP11 M Loss (Ra:2)" indicates the bending loss of the LP11 mode when Ra is 2.0.

As illustrated in FIG. 17, a range of Δ1 is present in which the bending loss of the LP11 mode is equal to or smaller than 5 dB/m and the leakage loss of the LP21 mode is equal to or larger than 1 dB/m in any of the cases where Ra is 2.0, 3.0, and 4.0. The range of Δ1 is shifted to a larger value with a decrease in Ra. Therefore, when Δ1 is desired to be set to a large value, it is better that Ra is set to be a small value.

FIG. 18 is a schematic diagram illustrating the calculation results of the optical characteristics of the optical fiber in the case that the relative refractive-index difference Δ1 is 0.33% and the diameter 2a of the center core portion is 17.2 μm when Ra illustrated in FIG. 17 is 2.0. The respective optical characteristics indicate the values thereof at a wavelength of 1550 nm. As illustrated in FIG. 18, by the setting of the preferable structural parameters, the following preferable characteristics are achieved: the effective core area of the LP01 mode is about 170 μm², the bending loss of the LP01 mode is equal to or smaller than 0.00000254 dB/m, the effective core area of the LP11 mode is about 247 μm², and the leakage loss of the LP21 mode is 4.88 dB/m.

In the optical fiber 10 according to the first embodiment, the microbending loss can be reduced by increasing the outer diameter of the cladding portion 12 so as to be larger than 125 μm. The microbending loss is defined as an amount of an increase in transmission loss due to microscopic bends applied to the optical fiber when a side pressure is applied to the optical fiber. By increasing the outer diameter of the cladding portion 12 so as to be larger than 125 μm, which is the outer diameter of a cladding portion of a typical optical fiber, an influence of the side pressure on light confinement is reduced. As a result, the microbending loss can be reduced. When the effective core area is increased, the microbending loss is also increased together with the increase in bending loss. By reducing the microbending loss in this way in the optical fiber 10 having a small bending loss, the restriction of the effective core area due to the microbending loss is relaxed. As a result, the effective core area can be further enlarged.

The optical fibers were manufactured using the structural parameters illustrated in FIG. 8 as the design values, as examples of the present invention. The outer diameter of the cladding portion was set to 125 μm (a first example) or 180 μm (a second example).

Figures 19, 20:
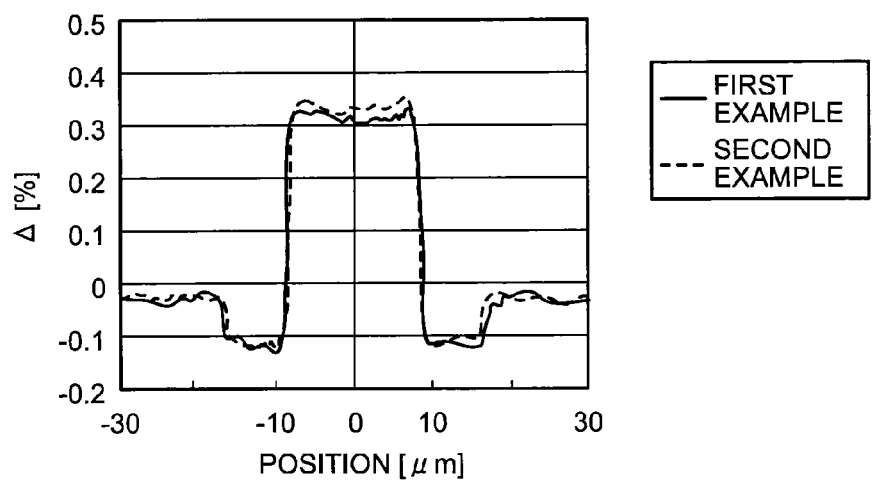
FIG. 19 is a schematic diagram illustrating measuring results of the refractive index profiles of the manufactured optical fibers of first and second examples.
FIG. 20 is a schematic diagram illustrating the calculation results of the optical characteristics at a wavelength of 1550 nm on the basis of the measuring result of the refractive index profile of the second example illustrated in FIG. 19.

FIG. 19 is a schematic diagram illustrating measuring results of the refractive index profiles of the manufactured optical fibers of the first and the second examples. The abscissa axis of FIG. 19 represents the position from the center of the core portion. FIG. 20 is a schematic diagram illustrating the calculation results of the optical characteristics at a wavelength of 1550 nm on the basis of the measuring result of the refractive index profile of the second example illustrated in FIG. 19. As illustrated in FIG. 20, the optical fiber of the second example estimated from the measured refractive index profile has the sufficiently small bending loss of the LP11 mode and the sufficiently large leakage loss of the LP21 mode, and the effective refractive indexes $n_{eff}$ and effective core areas of the LP01 and the LP11 modes were almost coincident with the results illustrated in FIG. 18. In this way, the optical fibers having the structural parameters almost as designed were able to be manufactured.

Light was input to the optical fibers of the first and the second examples so as to be propagated therein, and characteristics of light output after propagation were measured.

In this measuring method, a measuring optical fiber that transmits measuring light in a single mode is connected by a butt-joint to one end of the optical fiber of the first or the second example serving as the optical fiber to be measured. The connection is performed such that the center axis of the core portion of the optical fiber to be measured and the center axis of the core portion of the measuring optical fiber are off from each other by a predetermined offset. Then, a light source is connected to the other end of the measuring optical fiber. A measuring apparatus for measuring desired optical characteristics is connected to the other end of the optical fiber to be measured. In this state, measuring light output from the light source is input to the optical fiber to be measured from the measuring optical fiber. The measuring light that has been propagated in the optical fiber to be measured and is output is measured by the measuring apparatus. The wavelength of the measuring light was 1550 nm.

When the offset is set to zero, the LP01 mode having a field profile on the center axis can be mainly excited in the optical fiber to be measured. When the offset is set to a predetermined value, the LP11 mode having a field profile around the center axis can be mainly excited in the optical fiber to be measured. In this way, by appropriately setting the offset, a desired propagation mode can be excited in the optical fiber to be measured and light can be caused to be propagated in the propagation mode. As a result, the optical characteristics of a desired propagation mode can be measured.

Figure 21:
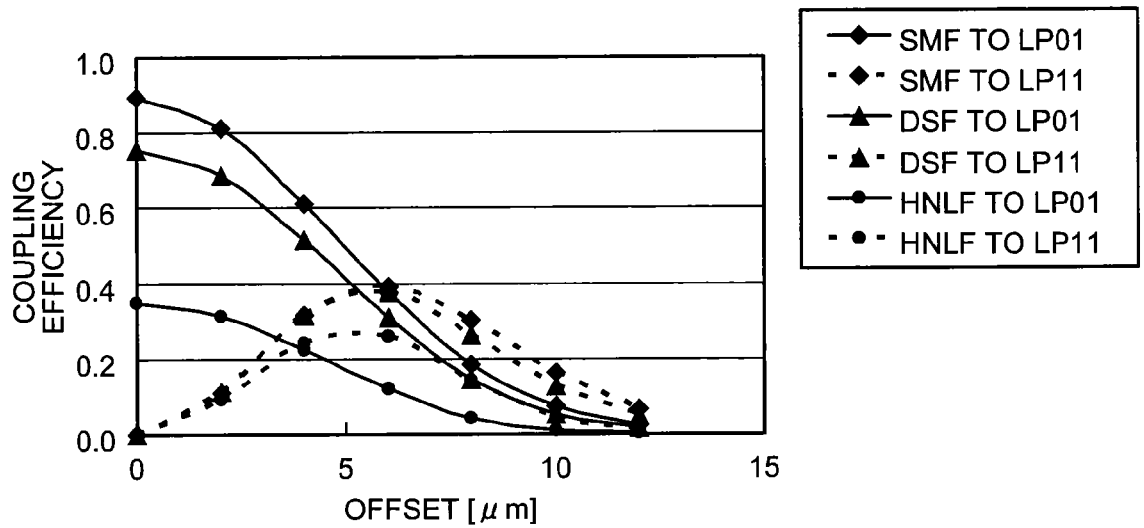
FIG. 21 is a schematic diagram illustrating the calculation results of a relation between an offset and an optical coupling efficiency when the optical fiber to be measured and a measuring optical fiber are connected by a butt-joint.

FIG. 21 is a schematic diagram illustrating the calculation results of a relation between the offset and an optical coupling efficiency when the optical fiber to be measured and the measuring optical fiber are connected by the butt-joint. The optical fiber having the structural parameters illustrated in FIG. 18 was used for calculation as the optical fiber to be measured. As the measuring optical fiber, a standard single mode optical fiber (SMF), which is for communication use and compliant with ITU-T G.652, a dispersion shifted optical fiber (DSF), and a high nonlinearity optical fiber (HNLF), were used. The effective core areas of the respective measuring optical fibers were set to 80 $\mu m^2$ (SMF), 45 $\mu m^2$ (DSF), and 13 $\mu m^2$ (HNLF). In the explanatory note of FIG. 21, "SMF TO LP11" means the coupling efficiency to the LP11 mode of the optical fiber to be measured when the measuring optical fiber is the SMF.

As illustrated in FIG. 21, in any of the measuring optical fibers, the coupling efficiency to the LP01 mode was high when the offset was 0 $\mu m$ and the coupling efficiency to the LP11 mode was high when the offset was about 6 $\mu m$. For this reason, the DSF was used for the measurement of the LP01 mode as the measuring optical fiber and the offset was set to 0 $\mu m$. For the measurement of the LP11 mode, the HNLF was used as the measuring optical fiber so as to be efficiently coupled to the LP11 mode and suppress the coupling with the LP01 mode, and the offset was set to 8 $\mu m$.

Figure 22:
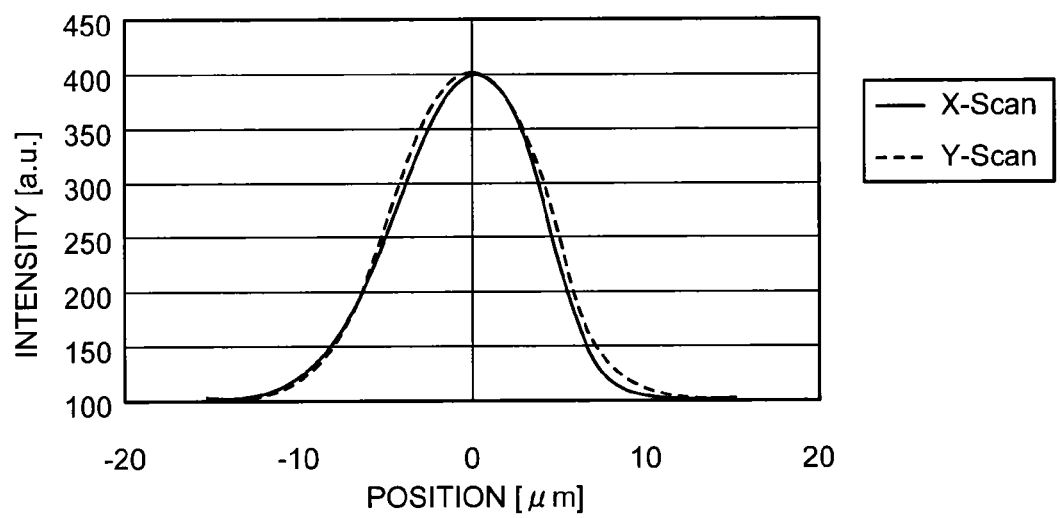
FIG. 22 is a schematic diagram illustrating a field profile of light output from the optical fiber of the first example when the offset is 0 μm.
Figures 23, 24:
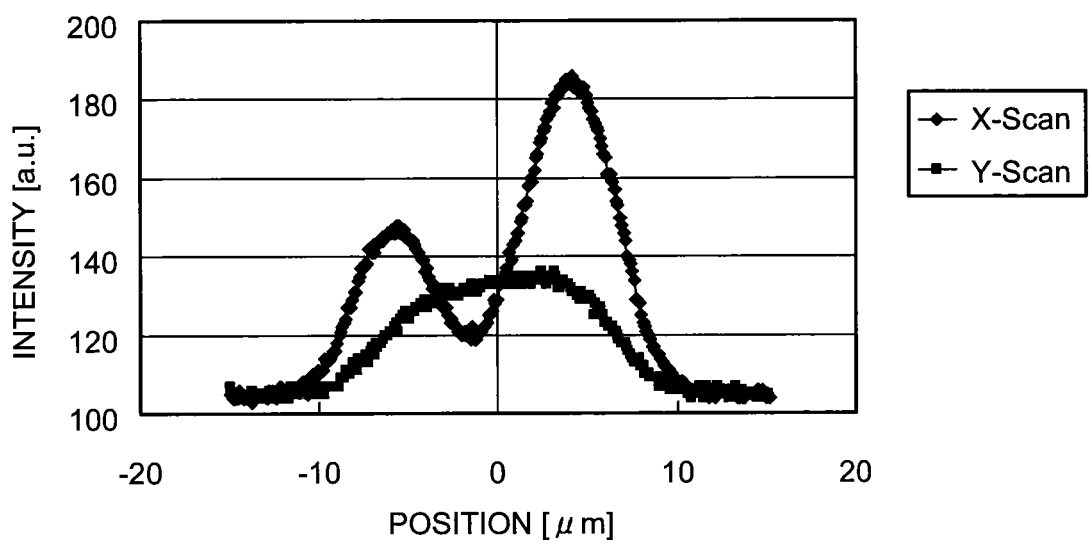
FIG. 23 is a schematic diagram illustrating a field profile of light output from the optical fiber of the first example when the offset is 8 μm.
FIG. 24 is a schematic diagram illustrating the measured optical characteristics of the optical fibers of the first and the second examples.

FIG. 22 is a schematic diagram illustrating a field profile of light output from the optical fiber of the first example when the offset was 0 $\mu m$. FIG. 23 is a schematic diagram illustrating a field profile of light output from the optical fiber of the first example when the offset was 8 $\mu m$. In FIGS. 22 and 23, the abscissa axes represent the position from the center of the core portion while the ordinate axes represent light intensity indicated with arbitrary unit. X-Scan and Y-scan indicate the measuring results along the X axis and the Y axis, respectively, which are orthogonal to each other. In this measurement, the length of the optical fiber of the first example was 2 m.

As illustrated by the shapes of the field profiles of FIGS. 22 and 23, the LP01 mode having a high intensity field near the center axis of the core portion was mainly excited when the offset was 0 $\mu m$. When the offset was 8 $\mu m$, the LP11 mode having a high intensity field around the center axis of the core portion in the X-axis direction was mainly excited. In this way, by appropriately setting the offset, a desired propagation mode can be mainly excited.

The optical characteristics of the optical fibers of the first and the second examples measured by the measuring method are described below. FIG. 24 is a schematic diagram illustrating the measured optical characteristics of the optical fibers of the first and the second examples. As illustrated in FIG. 24, in both of the optical fibers of the first and the second examples, the values of the effective core area were close to 170 $\mu m^2$ for the LP01 mode and close to 247 $\mu m^2$ for the LP11 mode, which were close to the values indicated in FIG. 18. In addition, in both of the optical fibers of the first and the second examples, the bending losses of the LP01 mode were equal to or smaller than 1 dB/m and the bending losses of the LP11 mode were equal to or smaller than 5 dB/m, which were good values. Furthermore, the transmission losses of the LP01 and LP11 modes of both of the optical fibers of the first and the second examples were good values, which were equal to or smaller than 0.5 dB/km.

A comparison between the first and the second examples in transmission loss shows that the transmission loss of the optical fiber of the second example, the outer diameter of the cladding portion (cladding diameter) of which is larger, is smaller. It is thought that the difference in transmission loss is because unwanted interference between modes caused by the influence of the microbending loss hardly occurs and thus an increase in transmission loss is more suppressed in the optical fiber having the larger cladding diameter. The microbending loss is defined as an amount of an increase in transmission loss due to microscopic bends applied to the optical fiber when a side pressure is applied to the optical fiber.

Figure 25:
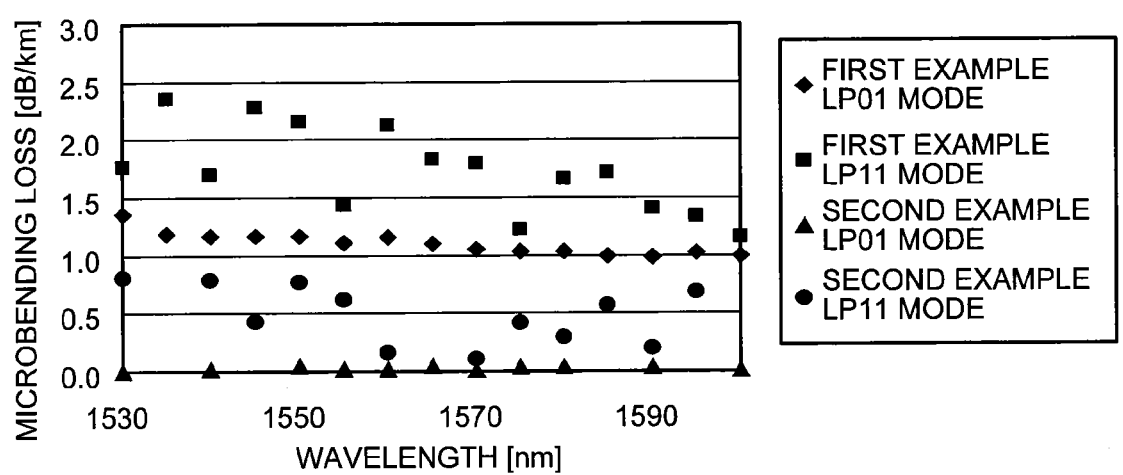
FIG. 25 is a schematic diagram illustrating wavelength dependences of the measured microbending losses of the optical fibers of the first and the second examples.

FIG. 25 is a schematic diagram illustrating wavelength dependences of the microbending losses of the optical fibers of the first and the second examples measured by the measuring method. As illustrated in FIG. 25, the microbending loss in the second example, in which the cladding diameter is larger, is smaller than that in the first example, in which the cladding diameter is smaller. In this way, by increasing the cladding diameter, an increase in transmission loss due to the microbending loss can be suppressed. In the optical fiber, the microbending loss of the LP11 mode is larger than that of the LP01 mode. Therefore, it is more preferable to suppress the influence of the microbending loss when the LP11 mode is used for optical transmission.

In the optical fiber 10 according to the first embodiment, two polarization modes are degenerated in the LP01 mode while four polarization modes are degenerated in the LP11 mode. In the calculation described above, one polarization mode is selected from each of the two or four degenerated modes and the calculation is performed. The degenerated polarization modes have almost the same optical characteristics. Accordingly, the calculation result described above is applicable to the other degenerated polarization modes. The utilization of the calculation result makes it possible to achieve the optical fiber appropriate for the transmission method, using not only the mode-division-multiplexing but also polarization mode multiplexing.

In the first embodiment, the refractive index profile around the core portion 11 is a W-shaped. The refractive index profile of the optical fiber according to the present invention, however, is not limited to this. Every refractive index profile is usable such as a single peaked type profile, a step type profile, a segment core type profile, a trench type profile, a W+ side core type profile, and a ring type profile. An optical fiber using the trench type profile is described below as a second embodiment of the present invention.

Figure 26:
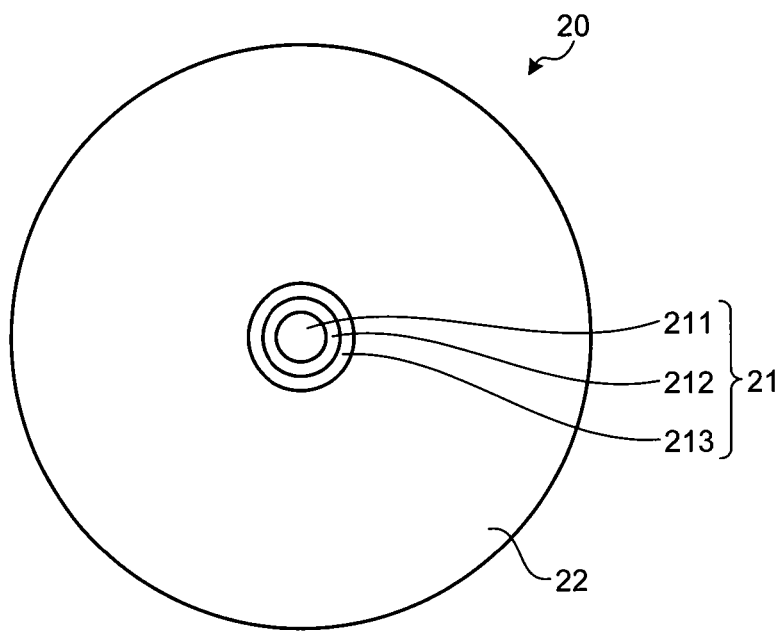
FIG. 26 is a schematic cross sectional view of an optical fiber according to a second embodiment.

FIG. 26 is a schematic cross sectional view of an optical fiber according to a second embodiment of the present invention. As illustrated in FIG. 26, an optical fiber 20 includes a core portion 21 located at the center thereof and a cladding portion 22 formed on the outer periphery of the core portion 11.

The core portion 21 consists of a center core portion 211, an inner core layer 212 formed on the outer periphery of the center core portion 211, and an outer core layer 213 formed on the outer periphery of the inner core layer 212. The center core portion 211 is made of silica glass containing dopant that increases a refractive index thereof. The inner core layer 212 is made of pure silica glass. The outer core layer 213 is made of silica glass containing dopant that decreases a refractive index thereof. The cladding portion 22 is made of pure silica glass. As a result, the center core portion 211 has a refractive index that is maximum in the core portion 21 and higher than that of the cladding portion 22. The inner core layer 212 has a refractive index almost equal to that of the cladding portion 22. The outer core layer 213 has a refractive index lower than that of the cladding portion 22.

Figure 27:
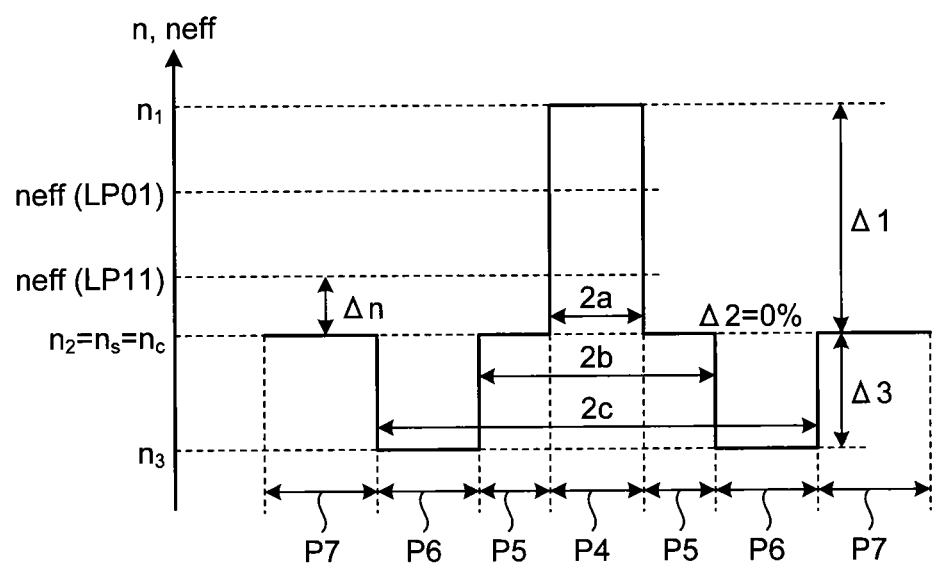
FIG. 27 is a schematic diagram illustrating a refractive index profile of the optical fiber illustrated in FIG. 26.

FIG. 27 is a schematic diagram illustrating a refractive index profile of the optical fiber 20 illustrated in FIG. 26. In FIG. 27, a region P4 illustrates the refractive index profile of the center core portion 211. A region P5 illustrates the refractive index profile of the inner core layer 212. A region P6 illustrates the refractive index profile of the outer core layer 213. A region P7 illustrates the refractive index profile of the cladding portion 22. As illustrated in FIG. 27, the optical fiber 20 has the refractive index profile of a trench type.

As illustrated in FIG. 27, the relative refractive-index difference of the center core portion 211 with respect to the cladding portion 22 is denoted by Δ1, the relative refractive-index difference of the inner core layer 212 with respect to the cladding portion 22 is denoted by Δ2, and the relative refractive-index difference of the outer core layer 213 with respect to the cladding portion 22 is denoted by Δ3. The relative refractive-index differences Δ1, Δ2, and Δ3 are defined by the following formulas (4), (5), and (6).

$$\Delta 1 = \{(n_1 - n_c)/n_c\} \times 100 [\%] \quad (4)$$

$$\Delta 2 = \{(n_2 - n_c)/n_c\} \times 100 [\%] \quad (5)$$

$$\Delta 3 = \{(n_3 - n_c)/n_c\} \times 100 [\%] \quad (6)$$

where $n_1$ is the maximum refractive index of the center core portion 211, $n_2$ is the refractive index of the inner core layer 212, $n_3$ is the refractive index of the outer core layer 213, and $n_c$ is the refractive index of the cladding portion 22. As described above, $n_2 \approx n_c$. Therefore, Δ2 is almost 0%. Almost 0% means −0.05% to 0.05%, which does not influence the optical characteristics such as Aeff much. Also, in the second embodiment, $n_c$ is equal to the refractive index $n_s$ of silica glass (which is 1.44439 at a wavelength of 1550 nm).

As illustrated in FIG. 27, a diameter of the center core portion 211 is denoted by 2a, the outer diameter of the inner core layer 212 is denoted by 2b, and the outer diameter of the outer core layer 213 is denoted by 2c. A ratio b/a of the diameter 2b of the inner core layer to the diameter 2a of the center core portion is denoted by Ra2. A ratio c/a of the outer diameter 2c of the outer core layer to the diameter 2a of the center core portion is denoted by Ra3. The diameter 2a of the center core portion is defined as a diameter at which the relative refractive-index difference Δ1 becomes 0% at a border between the center core portion 211 and the inner core layer 212. The outer diameter 2b of the inner core layer is defined as a diameter at which the relative refractive-index difference becomes 0% at a border between the inner core layer 212 and the outer core layer 213. The outer diameter 2c of the outer core layer is defined as a diameter at which the relative refractive-index difference becomes half of the relative refractive-index difference Δ3 at a border between the outer core layer 213 and the cladding portion 22.

As illustrated in FIG. 27, the effective refractive index of the LP01 mode, which is the fundamental propagation mode of the optical fiber 20 according to the second embodiment, is denoted by $n_{eff}$(LP01), while the effective refractive index of the LP11 mode, which is the first higher-order propagation mode of the optical fiber 20 according to the second embodiment, is denoted by $n_{eff}$(LP11). In the optical fiber 20, when the difference between $n_{eff}$(LP11) and the refractive index $n_c$ of the cladding portion 12 is denoted by Δn, Δn is equal to or larger than 0.0005.

As described above, in the optical fiber 20, the effective refractive index $n_{eff}$(LP11) of the LP11 mode, which is the first higher-order propagation mode, is larger than the refractive index $n_c$ of the cladding portion 12 by equal to or larger than 0.0005. As a result, the optical fiber 20 has the following characteristics at a wavelength of 1550 nm: the effective core area of the LP01 mode is equal to or larger than 120 μm², the effective core area of the LP11 mode is equal to or larger than 170 μm², and a bending loss is small in both of the LP01 and LP11 modes.

To achieve $n_{eff}$(LP11) that is larger than $n_c$ by equal to or larger than 0.0005, the following exemplary settings are made: Δ1 is 0.25%, Δ3 is −0.3%, 2a, 2b, and 2c are 15.5 μm, 31.0 μm, and 46.5 μm, respectively, (i.e., Ra2 is 2 and Ra3 is 3). When the structural parameters of the optical fiber 20 are set in this way, $n_{eff}$(LP11) is 1.446833, which is larger than $n_c$ (1.44439) by equal to or larger than 0.0005. Meanwhile, the desired characteristics at a wavelength of 1550 nm are obtained as follows: for the LP01 mode, the effective core area is 170.49 μm² and the bending loss is $1.74 \times 10^{-3}$ dB/m, and for the LP11 mode, the effective core area is 289.3 μm² and the bending loss is $4.74 \times 10^{-1}$ dB/m.

When the structural parameters of the optical fiber 20 are set as described above, the effective refractive index $n_{eff}$(LP21) of LP21, which is the second high-order propagation mode, at a wavelength of 1550 nm is 1.443498, which is smaller than the refractive index of silica glass (1.44439). As a result, in the optical fiber 20, at a wavelength of 1550 nm, the LP21 mode becomes the leaky mode, and only the two modes of LP01 mode and LP11 mode having little interference therebetween become propagation modes.

As described above, the optical fiber 20 according to the second embodiment has a large effective core area and a small bending loss for both of the LP01 and LP11 modes used therein, and very little interference between the respective propagation modes.

A preferable design of the optical fiber according to the second embodiment is described more specifically with reference to calculation results using simulations employing the finite element method.

FIG. 28 is a schematic diagram illustrating the structural parameters and the optical characteristics when the effective core area of the LP01 mode is set to around 130 μm². FIG. 29 is a schematic diagram illustrating the structural parameters and the optical characteristics when the effective core area of the LP01 mode is set to around 150 μm². FIGS. 30 to 32 are schematic diagrams illustrating the structural parameters and the optical characteristics when the effective core area of the LP01 mode is set to around 170 μm². In each figure, the optical characteristics indicate the values thereof at a wavelength of 1550 nm.

As illustrated in FIGS. 28 to 32, when the relative refractive-index difference Δ1 is equal to or larger than 0.20%, the relative refractive-index difference Δ3 is equal to or larger than −0.5% and smaller than 0%, the diameter 2a of the center core portion is equal to or larger than 12.0 μm and equal to or smaller than 18.0 μm, and the ratio Ra2 is larger than 1 and equal to or smaller than 4, and the ratio Ra3 is equal to or larger than 2 and equal to or smaller than 5, the optical fiber is achievable that has the effective core area of the LP01 mode of equal to or larger than 120 μm², the effective core area of the LP11 mode of equal to or larger than 170 μm², and small bending losses in the respective propagation modes. As for the bending loss, the combination of the structural parameters is selectable by which the bending loss of the LP11 mode is achieved to be equal to or smaller than 100 dB/m.

It is preferable to further increase $n_{eff}$ of the LP11 mode, i.e., $n_{eff}$ of the LP11 mode is preferably larger than $n_c$ by equal to or larger than 0.0010 (i.e., $n_{eff}$(LP11)=1.44539 or more), more preferably, by equal to or larger than 0.0016 (i.e., $n_{eff}$(LP11)=1.44599 or more). When Δ1 is equal to or larger than 0.25%, more preferably equal to or larger than 0.3%, then $n_{eff}$ described above is achievable, for example.

On the other hand, the setting of Δ1 to be smaller than 0.35% makes it possible that $n_{eff}$ of the LP21 mode is smaller than the refractive index of silica glass (which is 1.44439 at 1550 nm). The setting of Δ1 to be smaller than 0.35% makes it possible to achieve optical transmission in the two modes of LP01 mode and LP11 mode. In No. 170-31 to 170-35 of FIG. 31, $n_{eff}$ of the LP21 mode is 1.444713 to 1.444726, which is larger than 1.44439, while Δ1 is 0.35%.

Value ranges of the preferable structural parameters of the optical fiber according to the second embodiments are not limited to those described above. A relation between the relative refractive-index difference Δ3 and the bending loss or the leakage loss at a wavelength of 1550 nm when Ra3 is changed is described below.

Figure 33:
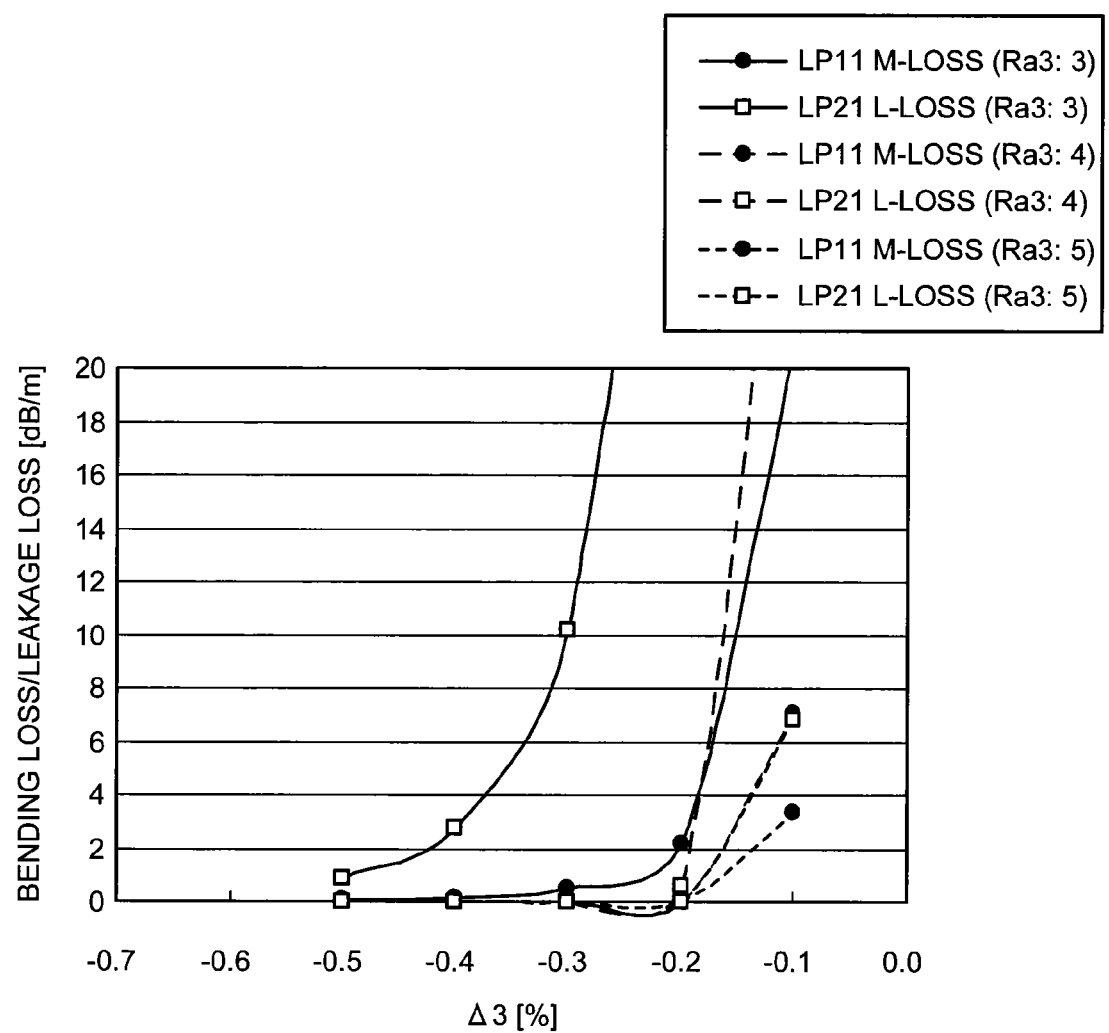
FIG. 33 is a schematic diagram illustrating the relation between a relative refractive-index difference Δ3 and the bending loss or the leakage loss when Ra is changed.

FIG. 33 is a schematic diagram illustrating the relation between the relative refractive-index difference Δ3 and the bending loss or the leakage loss when Ra3 is changed. In FIG. 33, the relative refractive-index difference Δ1 is fixed to 0.25% and Ra2 is fixed to 2. The diameter 2a of the center core portion is adjusted such that the effective core area Aeff of the LP01 mode is 170 μm². In the explanatory note of FIG. 33, "LP11 M Loss (Ra3:3 )" indicates the bending loss of the LP11 mode when Ra3 is 3. "LP21 L Loss (Ra3:3) indicates the leakage loss of the LP21 mode when Ra3 is 3.

As illustrated in FIG. 33, a range of Δ3 is present in which the bending loss of the LP11 mode is equal to or smaller than 100 dB/m and the leakage loss of the LP21 mode is equal to or larger than 0.1 dB/m in any of the cases where Ra3 is 3, 4, and 5. The range of Δ3 is shifted to a larger value with an increase in Ra3. When Δ3 is desired to be set to a large value, it is better that Ra3 is set to be a large value. For example, when Ra3 is 3 and Δ3 is −0.3%, the bending loss of the LP11 mode is 0.47 dB/m and the leakage loss of the LP21 mode is 10.2 dB/m. Thus a preferable characteristic is achieved in which light of the LP11 mode is sufficiently confined and light of the LP21 mode is sufficiently leaked. When the leakage loss is equal to or larger than 0.1 dB/m, an optical loss due to the leakage when light is propagated for 100 m in the optical fiber is equal to or larger than 10 dB, which is preferable.

In the optical fiber 20 according to the second embodiment, the microbending loss can be also reduced by increasing the outer diameter of the cladding portion 22 so as to be larger than 125 μm.

Figure 34:
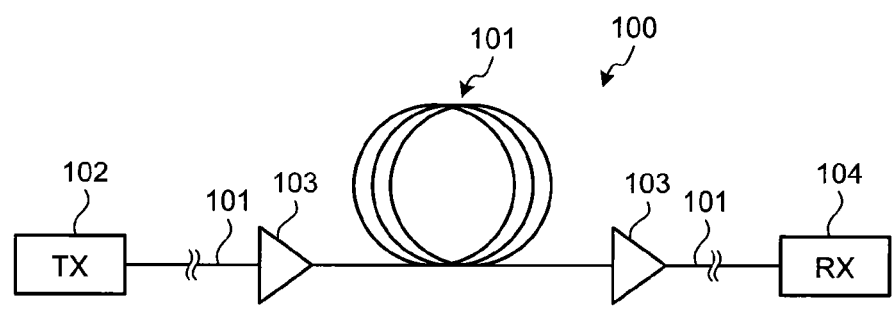
FIG. 34 is a schematic structural view of an optical transmission system according to a third embodiment.

Next, an optical transmission system according to a third embodiment of the present invention is described. FIG. 34 is a schematic structural view of an optical transmission system according to the third embodiment. As illustrated in FIG. 34, an optical transmission system 100 includes an optical fiber 101, an optical transmitting device 102, an optical amplifier 103, and an optical receiving device 104.

The optical fiber 101 is an optical transmission path that connects the optical transmitting device 102 and the optical receiving device 104. The optical fiber 101 is the optical fiber according to the first or the second embodiment, for example, and propagates light of a predetermined wavelength bandwidth to be used in a plurality of propagation modes.

The optical transmitting device 102 includes signal light sources such as semiconductor laser elements and outputs signal lights for signal transmission using a plurality of propagation modes (e.g., the LP01 and LP11 modes) of the optical fiber 101.

The optical amplifier 103 is inserted between the optical fibers 101. The optical amplifier 103 is configured to amplify signal lights propagating in the plurality of propagation modes of the optical fiber 101 per propagation mode. Field patterns of lights in the respective propagation modes differ from each other. Accordingly, the optical amplifier 103 can amplify the signal light in each propagation mode individually or simultaneously. The optical amplifier 103 need not be provided depending on a transmission distance (a total distance of the optical fibers 101 to be used).

The optical receiving device 104 includes a plurality of light receiving elements that receive signal lights propagated in the propagation modes of the optical fiber 101 and convert signal lights into electrical signals per propagation mode, and a signal processor that processes the electrical signals converted by the light receiving elements.

The optical transmission system 100 transmits signal lights by mode-division-multiplexing transmission using the optical fiber 101 capable of propagating a plurality of modes. Therefore, a transmitting unit of the optical transmitting device 102 and a receiving unit of the optical receiving device 104 each includes a mode multiplexer-demultiplexer that couples the signal lights into the respective propagation modes or demultiplexes the mode-multiplexed signal light into signal lights of the respective propagation modes for the signal lights to be received per propagation mode. The optical transmission system 100 can achieve an optical transmission system that has a large transmission capacity and in which the occurrence of the nonlinear optical phenomenon and the influence of the bending loss in the optical fiber constituting the optical transmission path are suppressed.

In the embodiments, the cladding portions are made of pure silica glass. For example, the center core portion may be made of pure silica glass, and the outer core portion and the cladding portion may be made of silica glass containing dopant that decreases a refractive index thereof. In the embodiments, the optical fibers are made of a silica based glass material. The material of the optical fiber according to the present invention is not limited to this. Any optical materials are appropriately usable that can constitute the optical fiber such as other glass materials and plastic materials.

That is, any optical fiber can have the effect of the present invention regardless of the refractive index profile and material thereof as long as the optical fiber has the effective core area of the fundamental propagation mode of equal to or larger than 120 μm², the effective core area of the first higher-order propagation mode of equal to or larger than 170 μm², and the effective refractive index is larger than the refractive index of the cladding portion by equal to or larger than 0.0005 at a wavelength of 1550 nm.

As for the wavelength of signal light to be transmitted by the optical fiber according to the present invention, a wavelength range including 1550 nm or a desired wavelength band used in optical fiber communication is usable.

The above-described embodiments do not limit the present invention. The combinations of the elements of the embodiments are also included in the present invention.

The optical fiber and the optical transmission method according to the present invention are preferable for use in optical communication applications.

Although the invention has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber, comprising:
a core portion; and
a cladding portion that is formed on an outer periphery of the core portion and has a refractive index lower than a maximum refractive index of the core portion, wherein
the core portion comprises a center core portion having the maximum refractive index, and an outer core portion that is formed on an outer periphery of the center core portion and has a refractive index lower than the refractive index of the cladding portion,
a relative refractive-index difference $\Delta 1$ of the center core portion with respect to the cladding portion is 0.20% to 0.50%, a relative refractive-index difference $\Delta 2$ of the outer core portion with respect to the cladding portion is equal to or larger than −0.50% and smaller than 0%, a diameter of the center core portion is 14.00 μm to 19.00 μm, and a ratio of an outer diameter of the outer core portion to the diameter of the center portion is larger than 1.0 and equal to or smaller than 4.0, and
characteristics at a wavelength of 1550 nm are an effective core area of a fundamental propagation mode of equal to or larger than 120 μm$^2$, an effective core area of a first higher-order propagation mode of equal to or larger than 170 μm$^2$, and an effective refractive index of the first higher-order propagation mode of larger than a refractive index of the cladding portion by equal to or larger than 0.0005.

2. The optical fiber according to claim 1, wherein the effective refractive index is larger than the refractive index of the cladding portion by equal to or larger than 0.0010.

3. The optical fiber according to claim 1, wherein the effective refractive index of the first higher-order propagation mode is larger than the refractive index of the cladding portion by equal to or larger than 0.0016.

4. The optical fiber according to claim 1, wherein only the two modes, namely the fundamental propagation mode and the first higher-order propagation mode allow propagation.

5. The optical fiber according to claim 1, wherein the first higher-order propagation mode is an LP11 mode.

6. The optical fiber according to claim 1, wherein an effective refractive index of an LP21 mode is smaller than a refractive index of silica glass.

7. The optical fiber according to claim 1, wherein an outer diameter of the cladding portion is larger than 125 μm.

8. The optical fiber according to claim 1, wherein the relative refractive-index difference $\Delta 1$ of the center core portion with respect to the cladding portion is equal to or larger than 0.22%, the diameter of the center core portion is 14.10 μm to 18.30 μm, and the ratio of the outer diameter of the outer core portion to the diameter of the center core portion is equal to or larger than 2.0.

9. The optical fiber according to claim 8, wherein the relative refractive-index difference $\Delta 1$ is equal to or larger than 0.30%.

10. The optical fiber according to claim 8, wherein the relative refractive-index difference $\Delta 1$ is smaller than 0.42%.

11. An optical fiber comprising:
a core portion; and
a cladding portion that is formed on an outer periphery of the core portion and has a refractive index lower than a maximum refractive index of the core portion, wherein
the core portion comprises of a center core portion having the maximum refractive index, an inner core layer that is formed on an outer periphery of the center core portion and has a relative refractive-index difference $\Delta 2$ which is −0.05% to 0.05% with respect to the cladding portion, and an outer core layer that is formed on an outer periphery of the inner core layer and has a refractive index lower than the refractive index of the cladding portion and a refractive index of the inner core layer, and
characteristics at a wavelength of 1550 nm are an effective core area of a fundamental propagation mode of equal to or larger than 120 μm$^2$, an effective core area of a first higher-order propagation mode of equal to or larger than 170 μm$^2$, and an effective refractive index of the first higher-order propagation mode of larger than a refractive index of the cladding portion by equal to or larger than 0.0005.

12. The optical fiber according to claim 11, wherein a relative refractive-index difference $\Delta 1$ of the center core portion with respect to the cladding portion is equal to or larger than 0.20% and smaller than 0.35%, a relative refractive-index difference $\Delta 3$ of the outer core layer with respect to the cladding portion is equal to or larger than −0.5% and smaller than 0%, a diameter of the center core portion is equal to or larger than 12.0 μm and equal to or smaller than 18.0 μm, a ratio of an outer diameter of the inner core layer to the diameter of the center core portion is larger than 1 and equal to or smaller than 4, and a ratio of an outer diameter of the outer core layer to the diameter of the center core portion is equal to or larger than 2 and equal to or smaller than 5.

13. The optical fiber according to claim 12, wherein, at a wavelength of 1550 nm, a bending loss of the first higher-order propagation mode at a bending with a diameter of 20 mm is equal to or smaller than 100 dB/m and a leakage loss of a second higher-order propagation mode is equal to or larger than 0.1 dB/m.

14. An optical transmission system, comprising:
an optical fiber, the optical fiber comprising:
a core portion; and
a cladding portion that is formed on an outer periphery of the core portion and has a refractive index lower than a maximum refractive index of the core portion, wherein
the core portion comprises a center core portion having the maximum refractive index, and an outer core portion that is formed on an outer periphery of the center core portion and has a refractive index lower than the refractive index of the cladding portion,
a relative refractive-index difference $\Delta 1$ of the center core portion with respect to the cladding portion is 0.20% to 0.50%, a relative refractive-index difference $\Delta 2$ of the outer core portion with respect to the cladding portion is equal to or larger than −0.50% and smaller than 0%, a diameter of the center core portion is 14.00 μm to 19.00 μm, and a ratio of an outer diameter of the outer core portion to the diameter of the center portion is larger than 1.0 and equal to or smaller than 4.0, and characteristics at a wavelength of 1550 nm are an effective core area of a fundamental propagation mode of equal to or larger than 120 μm$^2$, an effective core area of a first higher-order propagation mode of equal to or larger than 170 μm$^2$, and an effective refractive index of the first higher-order propagation mode of larger than a refractive index of the cladding portion by equal to or larger than 0.0005.

15. An optical transmission system, comprising:

an optical fiber, the optical fiber comprising:
  a core portion; and
  a cladding portion that is formed on an outer periphery of the core portion and has a refractive index lower than a maximum refractive index of the core portion, wherein the core portion comprises a center core portion having the maximum refractive index, an inner core layer that is formed on an outer periphery of the center core portion and has a relative refractive-index difference Δ2 which is −0.05% to 0.05% with respect to the cladding portion, and an outer core layer that is formed on an outer periphery of the inner core layer and has a refractive index lower than the refractive index of the cladding portion and a refractive index of the inner core layer, and characteristics at a wavelength of 1550 nm are an effective core area of a fundamental propagation mode of equal to or larger than 120 μm$^2$, an effective core area of a first higher-order propagation mode of equal to or larger than 170 μm$^2$, and an effective refractive index of the first higher-order propagation mode of larger than a refractive index of the cladding portion by equal to or larger than 0.0005.

\* \* \* \* \*